(12) United States Patent
Keller et al.

(10) Patent No.: US 8,601,420 B1
(45) Date of Patent: Dec. 3, 2013

(54) EQUIVALENT WAVEFORM MODEL FOR STATIC TIMING ANALYSIS OF INTEGRATED CIRCUIT DESIGNS

(75) Inventors: Igor Keller, Pleasanton, CA (US); Joel R. Phillips, Oakland, CA (US); Jijun Chen, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 66 days.

(21) Appl. No.: 12/960,387

(22) Filed: Dec. 3, 2010

Related U.S. Application Data

(60) Provisional application No. 61/267,003, filed on Dec. 4, 2009.

(51) Int. Cl.
G06F 17/50 (2006.01)
G06F 9/455 (2006.01)

(52) U.S. Cl.
USPC .......................................... 716/113; 716/108

(58) Field of Classification Search
USPC ................................................ 716/108, 113
See application file for complete search history.

(56) References Cited

U.S. PATENT DOCUMENTS

| | | | |
|---|---|---|---|
| 6,684,375 B2 * | 1/2004 | Tsukiyama et al. | 716/113 |
| 6,799,153 B1 * | 9/2004 | Sirichotiyakul et al. | 703/19 |
| 7,814,448 B2 * | 10/2010 | Abbaspour et al. | 716/100 |
| 7,861,191 B2 * | 12/2010 | Koch | 716/102 |
| 8,245,165 B1 | 8/2012 | Tiwary et al. | |
| 8,302,046 B1 | 10/2012 | Keller et al. | |
| 2004/0049748 A1 * | 3/2004 | Croix | 716/4 |
| 2004/0243954 A1 * | 12/2004 | Devgan et al. | 716/6 |
| 2005/0066296 A1 * | 3/2005 | Visweswariah | 716/6 |
| 2006/0112357 A1 * | 5/2006 | Nazarian et al. | 716/4 |

OTHER PUBLICATIONS

D. Ling, S. Abbaspour, P. Feldmann and C. Visweswariah; "A Moment-Based Effective Characterization Waveform for Static Timing Analysis"; Proceedings of Design Automation Conference (DAC) 2009, Jul. 26-31, 2009; pp. 19-24.

I. Keller, K. H. Tam and V. Kariat, "Challenges in gate level modeling for delay and SI at 65nm and below," Proceedings of Design Automation Conference (DAC) 2008; Jun. 8-13, 2008; pp. 468-473.

* cited by examiner

*Primary Examiner* — Stacy Whitmore
*Assistant Examiner* — Magid Dimyan
(74) *Attorney, Agent, or Firm* — Alford Law Group, Inc.

(57) ABSTRACT

In one embodiment, a method of constructing an equivalent waveform model for static timing analysis of integrated circuit designs is disclosed. The method includes fitting time point coefficients ($q_k$) and known time delay values from a delay and slew model of a receiving gate from a timing library; determining waveform values ($I_{kj}$) for input waveforms from the timing library; determining timing values ($d_j$) from a timing table in the timing library in response to the input waveforms of the timing library; and determining coefficients ($q_k$) by minimizing a residual of a delay equation.

30 Claims, 14 Drawing Sheets

FIG. 2C
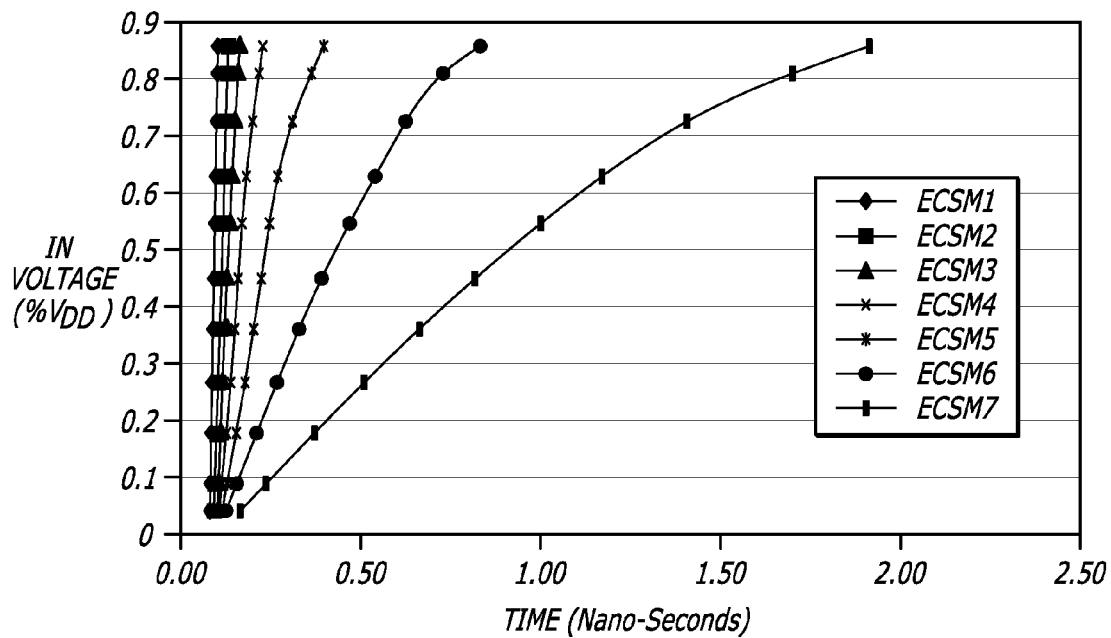
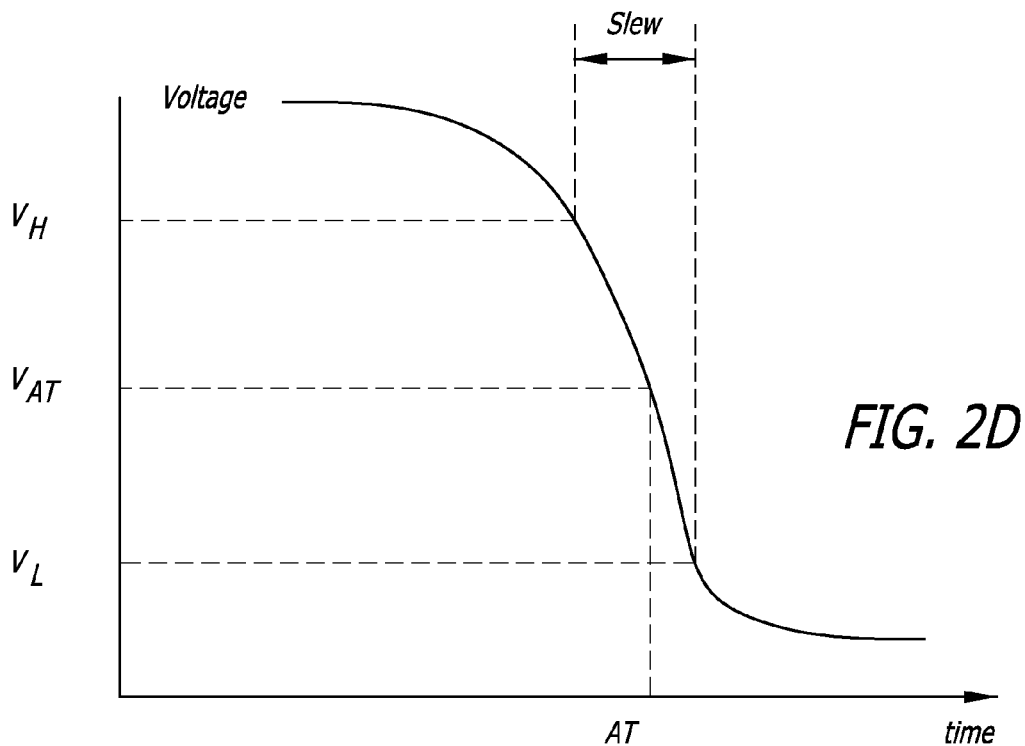
FIG. 2D

EQUIVALENT WAVEFORM MODEL FOR STATIC TIMING ANALYSIS OF INTEGRATED CIRCUIT DESIGNS

CROSS-REFERENCE TO RELATED APPLICATIONS

This non-provisional United States (U.S.) patent application claims the benefit of U.S. Provisional Patent Application No. 61/267,003 entitled EQUIVALENT WAVEFORM MODEL FOR STATIC TIMING ANALYSIS OF INTEGRATED CIRCUIT DESIGNS filed on Dec. 4, 2009 by inventors Igor Keller et al.

FIELD

The embodiments of the invention generally relate to static timing analysis of integrated circuit designs.

BACKGROUND

Electronic Design Automation (EDA) is used extensively in the design of integrated circuits. An electronic circuit under design is evaluated using models of devices and interconnections between the devices. A simulation using these models is then run to test the performance of the circuit.

Timing and signal integrity are ever increasingly important issues in integrated circuit design, particularly due to drastic scaling down rate of layout geometries as well as the increase in operating frequency. Static Timing Analysis (STA) methods are used for verifying and analyzing the timing constraints of a circuit.

Variations in semiconductor processing of an integrated circuit can cause changes in its performance and yield. In nanometer technologies, the variations have become significant and can not be ignored. The process variations are variations in electric characteristics of transistors due to the upstream steps of producing the ICs on a wafer, or the downstream steps of sealing the IC chips produced in the upstream steps in various kinds of packages. The performance of a chip is also affected by environmental variations, such as variations in temperature or supply voltage. The fluctuations in production conditions also affect the shapes and physical conditions of circuit elements. Therefore, characteristic variations of the semiconductor integrated circuits are inevitable.

In conventional approaches, STA is performed at the transistor or cell level using libraries of information and characteristics such as delay and slew. Most of the conventional approaches are "vectorless" and avoid the expense of dynamic simulation (e.g., SPICE simulation) to estimate timing. Due to the phenomenal advancement in drawing extremely small transistor dimensions and the push for aggressive design styles to achieve better chip functionality, the voltage waveforms, commonly observed in modern chips may differ significantly from the assumptions of STA. Conventional static timing analysis tool are often unable to capture non-idealities in the waveforms, for example, overshoots, spikes, ringing, etc.

Additionally, it is often difficult to exhaustively characterize the cells for all possible loading conditions. Thus, approximate equivalent capacitance models are formed for interconnects to generate look-up table values for the gate models. Due to these approximations and the intrinsic limitations of the models, the generated output waveforms do not match the real circuit behavior. The problem is more severe in the case of non-linear loading conditions, such as when other gates are coupled to the output of the driver as fan-out gates. The problem is further exacerbated due to large changes in transistor and interconnects characteristics in the presence of process variations.

In summary, different kinds of variations have an effect on timing. It is desirable to consider semiconductor processing variations in performing a static timing analysis of an integrated circuit. Therefore, there is a need for a system and process to provide a STA tool for more accurate and fast calculations of timing analysis using distorted (noisy) output waveforms through gates and interconnects.

BRIEF SUMMARY OF THE INVENTION

The embodiments of the invention are best summarized by the claims that follow below.

Briefly however, an equivalent waveform model (EWM) for static timing analysis of integrated circuit designs is disclosed to improve accuracy in delay calculation especially in presence of nonlinear or noisy input waveforms. The EWM is based on notion of a generalized delay metric which is built using properties of receiving cell and the load of the correspondent instance. In one embodiment of the invention, a delay metric is built using the high-order integral function of time points from the waveform and corresponding weight function which is based on respective voltage points on the same waveform. Effective current source model (ECSM) waveforms and their respective lookup-table delay in the timing library can be used to train the delay metric, and parameters of the metric are derived using least-square fitting. The trained delay metric may be used to predict cell delay for a distorted waveform distorted by noise.

BRIEF DESCRIPTIONS OF THE DRAWINGS

FIG. 1D is a diagram of an integrated circuit having input and output pins with logic gates and interconnect there-between.

FIG. 2C is a waveform diagram illustrating seven ECSM waveforms used to train the delay metric of the embodiments of the invention.

FIG. 2D is a waveform diagram illustrating the conventional method of calculating arrival time AT and slew rate S based on voltage crossing times at voltage threshold levels VH, VL, and VAT.

DETAILED DESCRIPTION

Figure 1A:
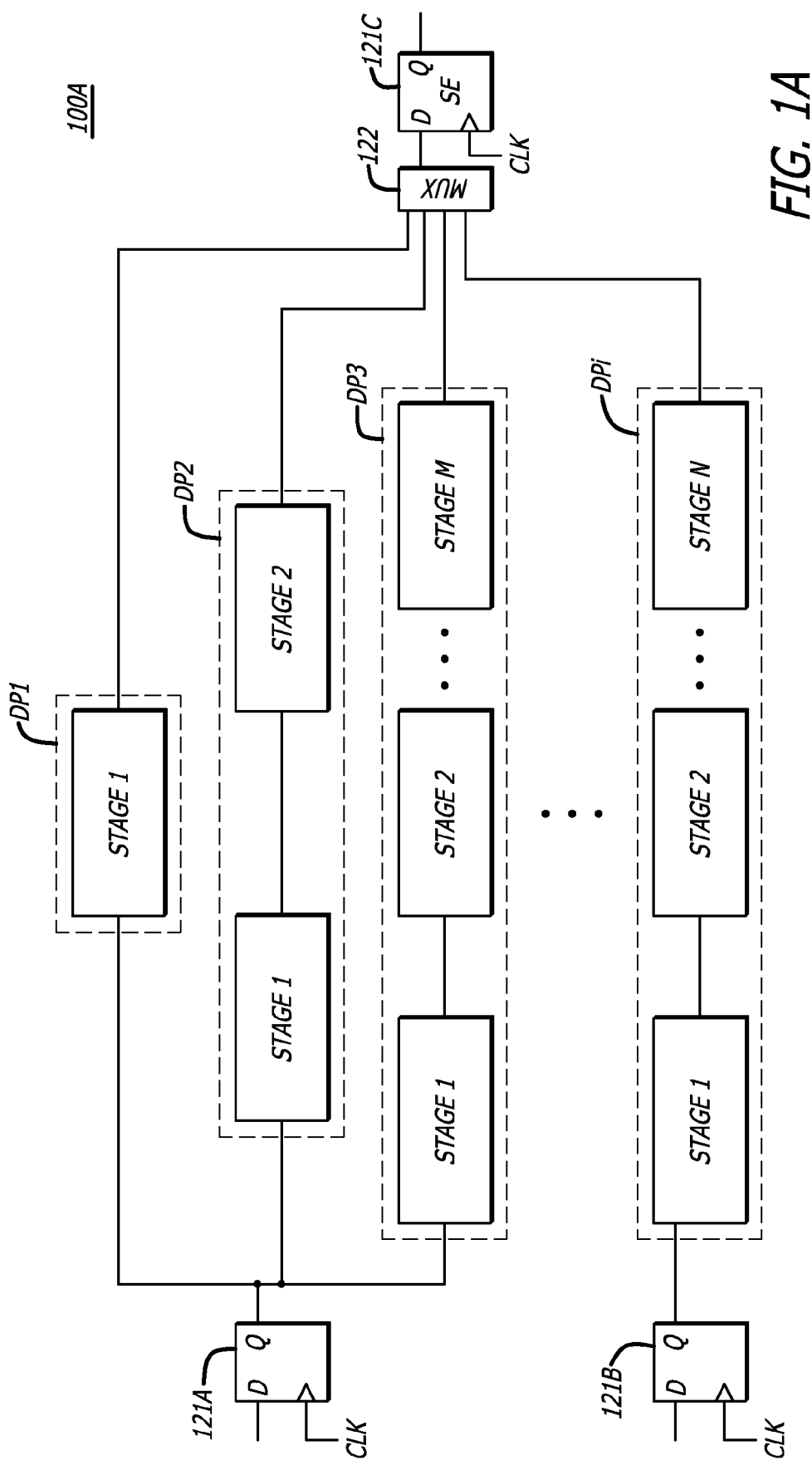
FIG. 1A is a block diagram of a portion of an exemplary netlist of an integrated circuit with stages of standard cells along delay paths between flip flops.

In the following detailed description of the embodiments of the invention, numerous specific details are set forth in order to provide a thorough understanding of the embodiments of the invention. However, the embodiments of the invention may be practiced without these specific details. In other instances well known methods, procedures, components, and circuits have not been described in detail so as not to unnecessarily obscure aspects of the embodiments of the invention.

INTRODUCTION

In general, static timing analysis (STA) involves identifying timing paths within the design, calculating delay of each path, and finally comparing the path delay against timing constraints specified in the design. The basic idea of STA is based on representation of logic function by Boolean variables (variables that can take on values of logical zero and one). In traditional STA methodologies, logic levels and corresponding valid transitions between them are propagated from one stage (gate) to another. A voltage transition at a particular circuit node has the topology of a saturated ramp. However, conventional STA simplifies the transition by approximating it with a linear saturated ramp. Accordingly, the signal transitions may be modeled using two parameters of transition, arrival time (AT) and slew.

In the framework of STA, these two parameters of transition are computed at output of each stage and then propagated through the circuit in a topological order. The calculation of arrival time of output signals at the output of each stage is determined by using the timing delay in the stage itself (stage delay) and the arrival times of the input signals at the input of the stage. The stage delay and the output slew are computed during the delay calculation step of STA. A response (transition) at the stage's outputs is computed using (often simplified) gate and driven interconnect models. The output slew and the overall timing delay are then computed from this response. Earlier table-lookup delay models were motivated by this abstraction, where these two parameters would be tabulated as a function of input slew and output load capacitance. These models can have significant inaccuracies as transitions in modern designs are quite different from a linear ramp. Also, seemingly insignificant details of the waveform can affect the delay of next stages by appreciable amounts. Moreover, interconnects are often very resistive which means that they can hardly be modeled by a single capacitance. Hence, the major aspects of the timing analysis problem are modeling the gate behavior in presence of non-ideal waveforms, bias and loading conditions and efficiently simulating linear interconnect networks.

The most successful amongst the gate models have been the current-source models. They represent the output current and impedance of a logic gate as a function of input voltage in tabular form. As for the linear interconnect network, there are fairly mature techniques for applying model order reduction ideas to solve the resulting large linear circuit equations efficiently. Together, this strategy results in a substantial improvement over table-lookup based strategies, but there are still some drawbacks to this approach. Once the models for the gates and the interconnect network are generated, they are simulated using time-step integration techniques which can lead to long analysis time. In the presence of large variations in manufacturing process, the problem of extracting these models becomes more complicated as one has to extract the model information not only for the nominal condition, but also for different settings of process parameters resulting in huge model sizes. Finally, with most static timing analyzers (static timers), the more detailed waveform information is discarded after a single circuit stage with only the delay/slew numbers being retained to propagate through additional circuit stages.

Significant progress has been made in addressing these problems resulting from the underlying assumptions and approximations of transition STA. The simplest, straightforward and most accurate solution for analyzing timing of a circuit is to perform a full SPICE (Simulation Program with Integrated Circuit Emphasis) analysis of the complete circuit. However, SPICE and fast SPICE simulators, though accurate, are still slow when simulating millions of gates that are now routinely found in digital integrated circuit chips. Therefore, it is computationally impractical to perform SPICE level simulations of a complete digital integrated circuit chip that has a large number of circuit elements.

The alternative approach is a fine grained modeling of the digital gates. Instead of characterizing a waveform with a delay and a slew number, waveforms are represented using a host of different values like overshoot, spikes, decay number (e.g., time taken to go from 10% to 1% of a high or low logic value), etc., apart from the regular metrics of delay and slew (e.g., time taken to go from 10% of Vdd to 90% of Vdd). The details in characterizing the waveform may be proportional to the accuracy of a model and the static timing analysis of a path.

To improve simulation time in simulating complete integrated circuit, models of the input and output interfaces of digital gates may be used with model order reduction (MOR) techniques to efficiently simulate large, linear interconnected networks.

The most widely available cell delay models have been the table lookup models. These models, when indexed by the input slew and the effective load capacitance, produce delay and slew numbers at the output of the cell. One assumption made when using a table lookup model is that the waveform is linear between the slew threshold regions VL and VH.

However with channel lengths of 90 nanometers (nm) or shorter, the input waveforms are becoming highly non-linear due to high shielding resistance offered by long interconnects. Coupled with signal integrity issues, where many highly coupled nets switching simultaneously in the same direction or opposite direction, an input waveform may be both non-linear and distorted with noise. To effectively and quickly predict an accurate delay for such nonlinear and noisy input waveforms is a challenge.

Fundamentally, the difference between actually (calculated) transition, and the one used for library characterization is the root cause of a significant inaccuracy of calculated delay, slew and their sensitivities with respect to process parameters.

Accuracy in the static timing analysis and simulation of an integrated circuit can be improved if appropriate modeling algorithms are utilized.

Delay Path Stages

Referring now to FIG. 1A, a block diagram of a portion of an exemplary netlist for an integrated circuit design 100A is illustrated. The block diagram of the portion of the integrated circuit design 100A includes a plurality of delay paths DP1-DPi from D flip-flops/latches/registers 121A-121B multiplexed into a D flip-flop/latch/register 121C by a multiplexer 122. The embodiments of the invention may be used to statically compute the timing delays through the delay paths between the D flip-flops/latches/registers 121A-121B and the D flip-flop/latch/register 121C.

The delay paths DP1-DPi may have various stages of different standard cells of logic gates. A first delay path DP1 includes a single stage, Stage 1. A second delay path DP2 includes two stages, Stage1 and Stage2. A third delay path DP3 includes M stages, Stage1 through StageM. An $i^{th}$ delay path Dpi includes N stages, Stage1 through StageN.

Figure 1B:
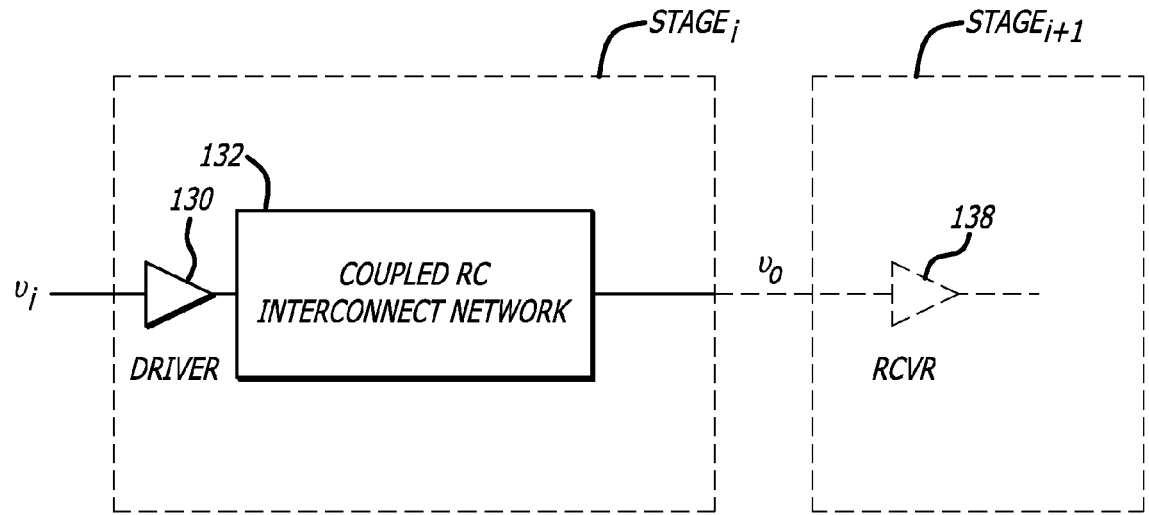
FIG. 1B illustrates an exemplary pair of stages coupled together.

FIG. 1B illustrates an exemplary pair of stages of standard cells, Stage(i) and Stage(i+1). Stage(i) may be modeled by a driver 130 driving a coupled RC interconnect network 132 and a load impedance of a receiver 138. A voltage source Vi having a waveform generated by a prior stage is coupled to the input of driver 130. In response to the input voltage V1 and the coupled RC interconnect network 132, the driver 130 generates an output voltage V0 at the one or more outputs of the stage(i). While the description herein may describe a model with a single output, it may be readily duplicated for a standard cell or logic gate with a plurality of outputs.

Figure 1C:
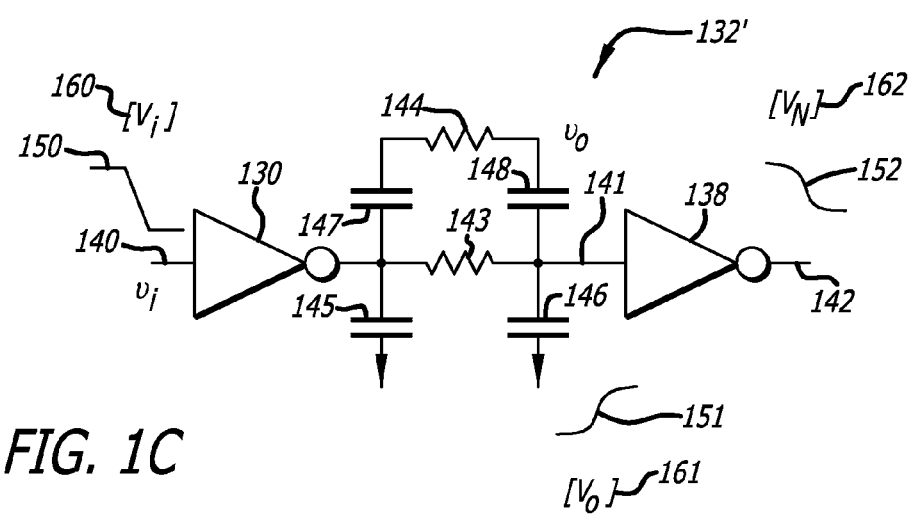
FIG. 1C is a schematic diagram of an exemplary stage of a standard cell in a netlist with waveforms being pushed through the circuit.

Referring now to FIG. 1C, a schematic diagram of a circuit representative of an exemplary pair of stages coupled together to illustrate the concept of waveform pushing. A first stage of the circuit includes the driver 130 and the RC interconnect network 132'. A second stage of the circuit includes a receiver 138. The RC interconnect network 132' coupled between the driver 130 and the receiver 138 includes one or more resistors 143-144 and one or more capacitors 145-148 coupled together as shown.

An input waveform 150 $v_{in}$ is coupled into the driver 130 at node or net 140. The output driver and the RC interconnect network 132' form an output waveform 151 on node or net 141 that is coupled into the input of the receiver 138. The receiver 138, in response to the waveform 151, may generate an output waveform 152 on an output node or net 142.

Waveform Based Static Timing Analysis

Waveform based variational static timing analysis (WAVSTAN) of an electronic circuit may be used to determine timing information thereof as shown and described in U.S. patent application Ser. No. 12/331,072 filed on Dec. 9, 2008 by inventors Saurabh K. Tiwary et al., entitled METHODS AND APPARATUS FOR WAVEFORM BASED VARIATIONAL STATIC TIMING ANALYSIS, which is incorporated herein by reference. In this case, an output voltage is provided that behaves as a function of the input voltage with variation induced distortions using available characterized cell library models. Waveform based variational static timing analysis (WAVSTAN) conveys the actual shape of the output waveform voltage, such as waveforms 150-152, rather than simply reporting the delay and slew of a circuit.

Waveforms may be pushed down along a path to simulate timing in a circuit. In this approach, a given input waveform is sequentially pushed through the various interconnects and logic networks of a circuit until it reaches an output. Complete waveforms are solved at each stage so that the actual shape of the waveform with respect to time is moved around across the gates and interconnects.

For example, consider the schematic of the circuit illustrated in FIG. 1C. An input waveform 150 represented by a vector or matrix 160 is pushed through the driver 130 and the RC interconnect network 132' to generate the waveform 151 represented by a vector or matrix 161. Further, the waveform 151 is pushed through the receiver 138 to generate the output waveform 152 represented by a vector or matrix 162. The vectors or matrices 160-162 representing the waveforms may be simplified and/or compressed to improve the efficiency of the simulation computations.

Figure 1D:
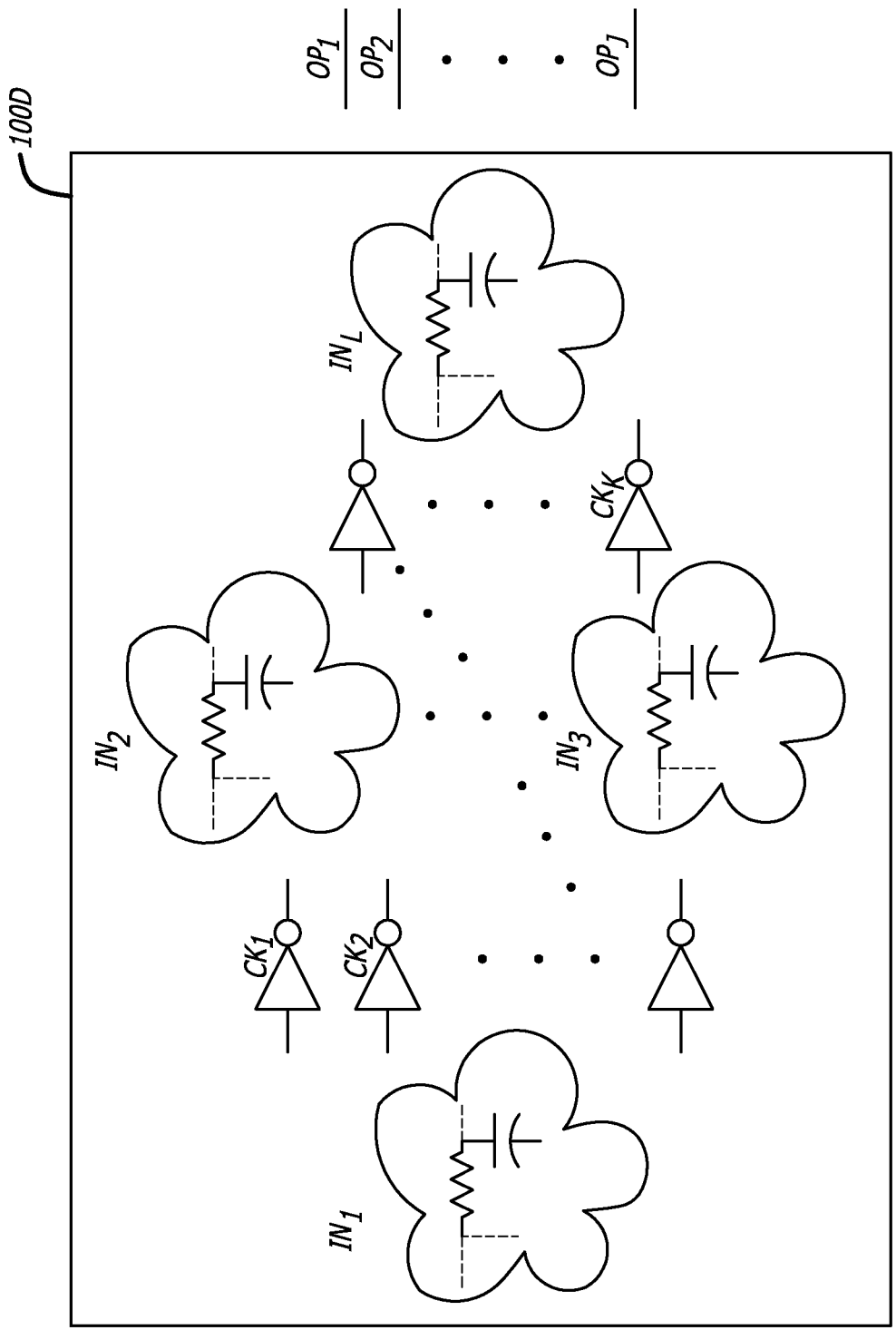

Referring now to FIG. 1D, the embodiments of the invention calculate the timing for a digital circuit under realistic excitation conditions. If a digital circuit 100D has inputs IPi for i=1, 2, . . . , I and outputs OPj for j=1, 2, . . . , J, the waveforms at these terminals can be represented as wv(IPi) or wv(OPj). The circuit has $C_k$ circuit blocks for k=1, 2, . . . , K connected by interconnect networks IN1 for j=1, 2, . . . , L. The characteristics (e.g. delay, rise/fall-time, overshoot, etc.) of a waveform wv(OPj) at the output OPj of a circuit can be determined as a function of a particular set of input waveforms {wv(IP$_1$), wv(IP$_2$), . . . , wv(IP$_1$)} to the circuit.

Generally, a waveform based static timing analysis generally includes: (a) extracting or receiving a layout (netlist) of an integrated circuit, including a plurality of logic gates and transistors; (b) dividing or partitioning the layout (netlist) into sub-layouts (sub-netlists); (c) pushing an input waveform through the various interconnects and logic networks of the circuit until it reaches an output; (d) deriving output voltage waveforms from input waveforms at each stage of waveform pushing; and (e) using the output voltage waveforms to determine the timing of the integrated circuit.

Figure 2A:
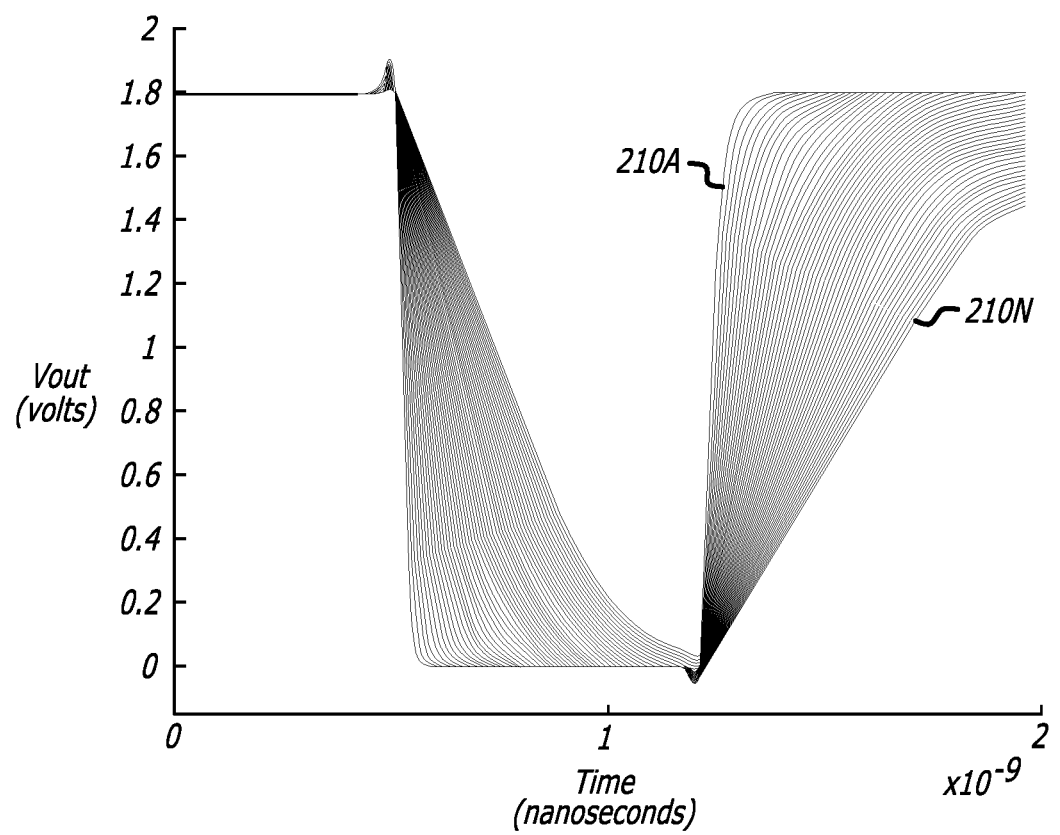
FIG. 2A illustrates a waveform diagram of an exemplary set of output waveforms that may be generated by an output driver in response to variance of a circuit parameter.

FIG. 2A illustrates output waveforms 210A-210N that may be generated by the model. As the output waveforms propagate to an input receiver, noise may be added to the waveform by interconnect and cross talk switching. The output waveform may be distorted when it arrives at the input of the receiver in the next stage.

Static timing analysis (STA) models for cells in a cell library are typically formed and characterized to measure slew rate of a rising input voltage on a sloped curve from 0.2 VDD (20% of power supply voltage VDD) to 0.8 VDD (80% of power supply voltage VDD) and for a falling input voltage from 0.8 VDD to 0.2 VDD. Moreover on the input voltage waveform and the output voltage waveform, models are typically formed and characterized to measure arrival time or delay at 0.5 VDD on each. Noise glitches or distortion in the input voltage waveform can make it difficult for former models to properly determine the slew rate of the input voltage waveform and/or the 0.5 VDD (50% of power supply voltage VDD) point in the input voltage waveform.

Figure 2B:
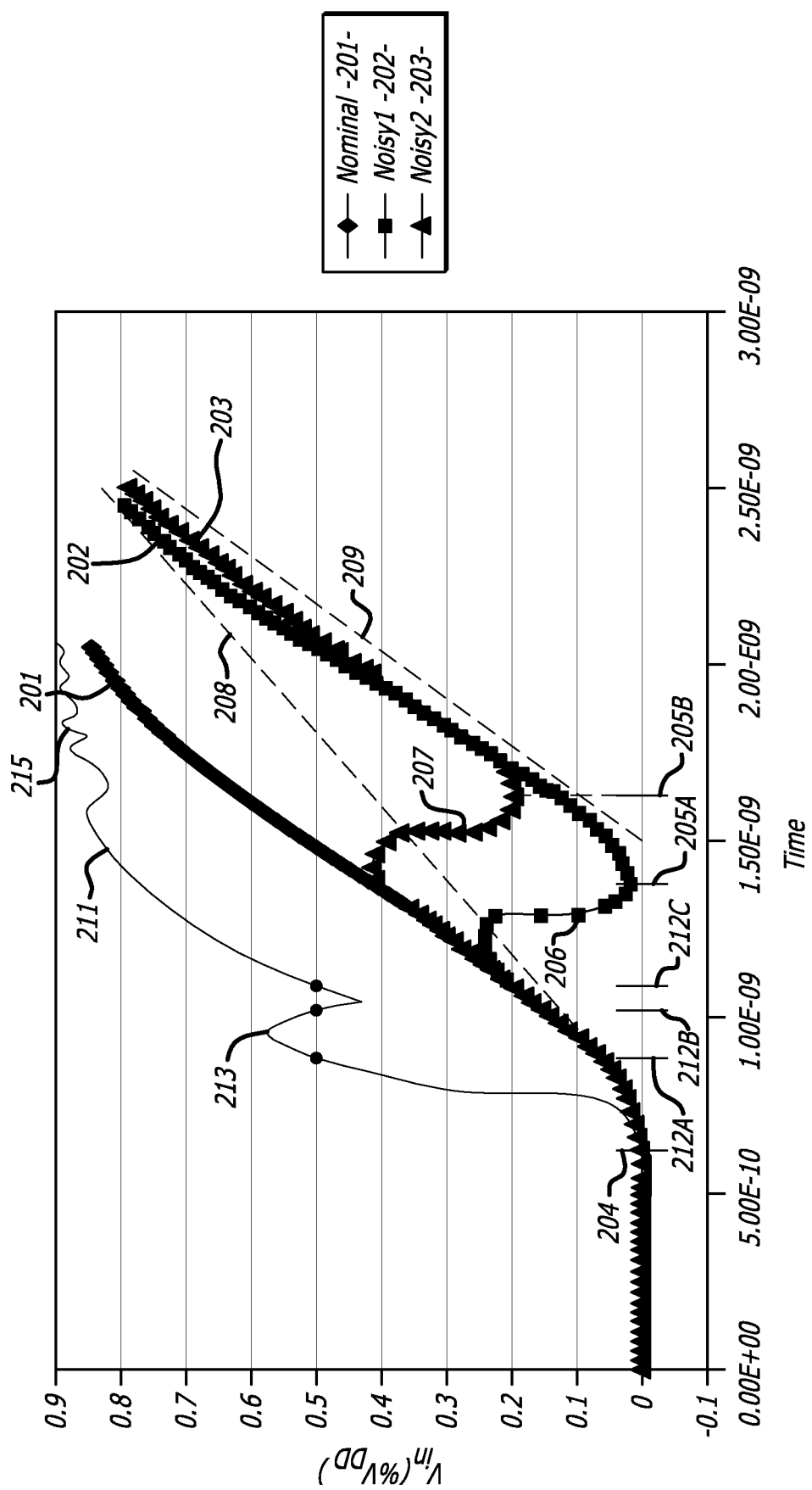
FIG. 2B is a waveform diagram illustrating nominal waveforms and noisy waveforms that may be expected at the input to the driver model.
Figure 2E:
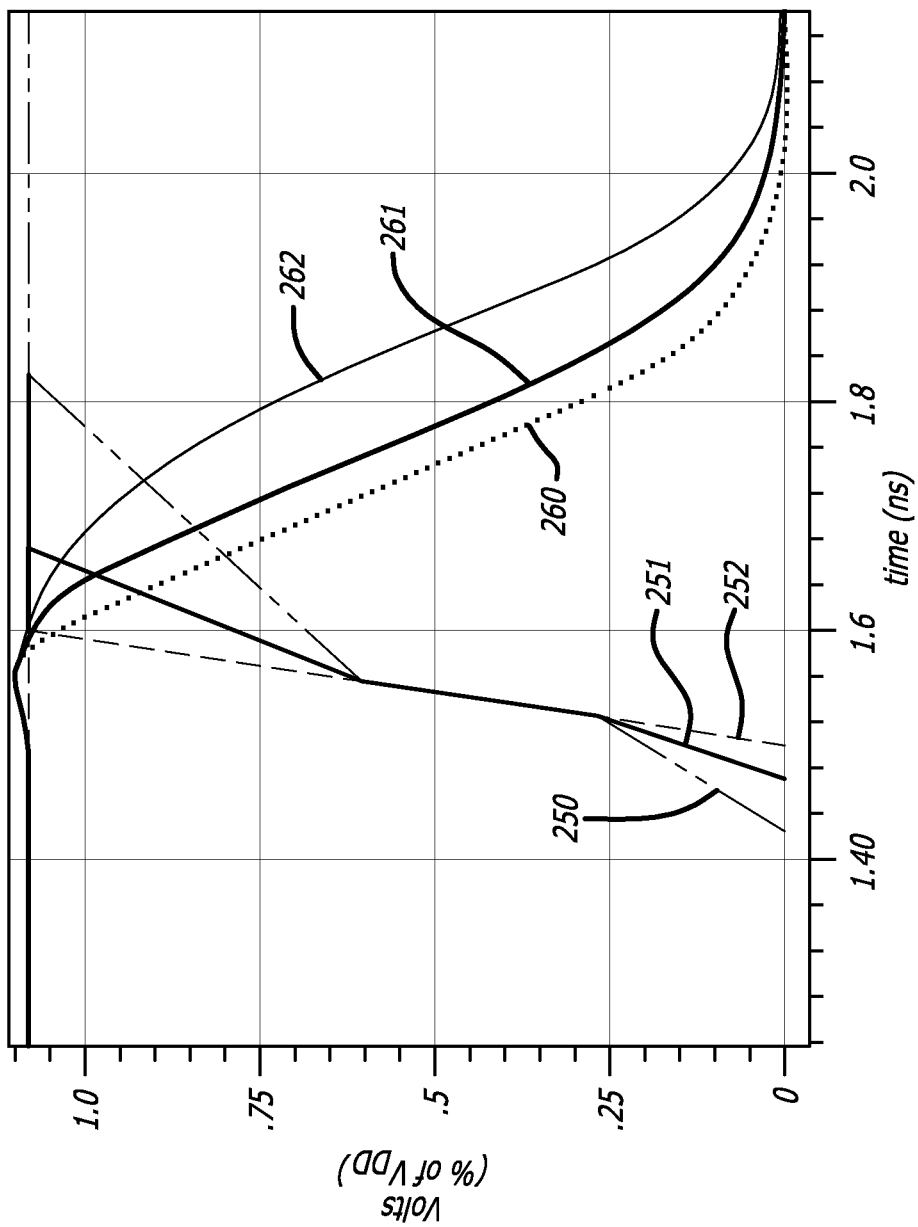
FIG. 2E is a waveform diagram illustrating three input waveforms with substantially the same arrival time and slew rate (conventionally determined as in FIG. 2D) at an input of an input receiver can have a different impact on the delay of the next stage when a look up table model is used.

FIG. 2B illustrates exemplary input voltage Vin waveforms 201-203 and 211 plotted as a percentage of VDD versus time. Vin waveform 201 is a nominal waveform, without noise, smoothly rising from 0.1 VDD to 0.8 VDD. To characterize this waveform, a simple input ramp from 0 volts to VDD volts having the same slope as the waveform 201 may be used to characterize a gate, cell or block. The waveforms 202-203, 211 each include a respective noise glitch 206-207, 213. The noise glitches 206-207 in input voltage waveforms 202-203 rise sufficiently enough to trigger an improper measurement of slew rate along the slope of line 208 instead of measuring slew rate along the slope of line 209. Moreover, an incorrect start time for waveforms 202-203 may be measured at time 204 instead of times 205A-205B.

In FIG. 2B, the waveform 211 includes a noise glitch 213 that causes the waveform to cross thrice over 0.5 VDD (50% of the power supply voltage VDD) at time points 212A, 212B, and 212C. With three different time points for 0.5 VDD crossing in the input waveform, it is difficult to determine which to use for delay in the generation of the output waveform.

Static Timing Analysis (STA) is a crucial step in the design process of an integrated circuit. In its essence, it models timing behavior of the integrated circuit design by abstracting it with a timing graph (TG) and propagating worst arrival time (AT) along it. Two parameters, arrival time AT and slew rate S of a transition, can represent a voltage transition at an electrical node of the circuit. Propagation of the AT to the next node of the TG, requires delays to be computed for each arc of the TG. The delay and slew calculation to represent a voltage waveform at a node is usually performed by a delay calculator, a separate module of a static timing analyzer tool. The delay calculator (DC) analyzes a small sub-circuit of the design at a time. This sub-circuit is often called a stage. Each stage includes a driving gate, interconnect parasitics and one or more receiving gates. An example of stage is shown in FIGS. 1B-1C. Such as shown in FIG. 1A, the stages may be considered as being coupled together in series along a path that is being analyzed by the static timing analyzer.

The goal of the delay calculator is to compute voltage transitions 151 (referred to as output transitions) at each receiver input 141 using a known transition 150 (referred to as input transitions) at the inputs 140 of the driver 130. The time delay between input transitions 150 and output transitions 151 for every receiver 138 and slews of the output transitions 151 are determined and annotated back onto the timing graph (TG). The delay is a difference between two arrival times (ATs) of corresponding transitions.

Referring now to FIG. 2B, the conventional way of calculating arrival time AT and slew S on a transition is now described. The arrival time AT is a time when a transition crosses a voltage threshold. The arrival time threshold voltage $V_{AT}$ is usually defined to one half of the positive power supply voltage ($V_{AT}=0.5$ Vdd). For example, the arrival time AT of waveform 201 is around 1.5 nano-seconds. The slew rate S is a difference between a low time point $t_L$ and a high time point $t_H$ when the transition crosses respectively a low voltage point $V_L$ and a high voltage point $V_H$.

The conventional slew rate S and arrival time AT can be mathematically defined using a parameterized functional in Equation A as follows:

$$J_{crs}[v(t), V_{thresh}] = \int_0^{Vdd} \delta(v - V_{thresh}) t(v) dv \qquad \text{(Equation A)}$$

In Equation A, the lower case sigma δ is a Dirac delta function and the threshold voltage $V_{thresh}$ is a parameter. The parameterized functional $J_{crs}$ associates a value to a transition (voltage as a function of time), and may be used to mathematically define the conventional arrival time AT with Equation B and mathematically define the conventional slew rate S with Equation C as follows:

$$AT = J_{crs}[v(t), V_{AT}] \qquad \text{(Equation B)}$$

$$S = J_{crs}[v(t), V_L] - J_{crs}[v(t), V_H] \qquad \text{(Equation C)}$$

The subscript crs is used to denote that the parameterized functional $J_{crs}$ is providing crossing time of the transitions at a certain voltage value. Other than the three time values of arrival time, slew rate, and crossing time, the details of the transitioning waveform are not captured in the conventional definition of slew rate S and arrival time AT.

This abstraction of a physical waveform transition by two parameters, slew rate S and arrival time, has been working fairly well in old process nodes. However, with advance of technologies and increase in interconnect resistance and crosstalk, the waveform shape is playing a more important role in timing analysis.

Referring now to FIG. 2B, waveforms 201-203 illustrate three different waveform transitions that have the same arrival time and the same slew rate. The respective transitions in these waveforms represent an output of an inverter driving different capacitive loads. As can be seen by comparing waveforms 202-203 against waveform 201 in the Figure, the conventional slew S and arrival time AT parameters are not good characteristics of the waveform in terms of receiver output arrival time.

A conventional delay calculator DC may use a cell delay model which is based on pre-characterized cell delay and output slew as functions of input slew and capacitive load. The fact that only a single parameter of the input waveform is used in DC is contributing to possibly high inaccuracy in delay.

A generic model is proposed that allows extraction of values for slew rate S and arrival time AT in such a way that it reduces error in the calculation of arrival time AT observed at the next stage (output of receiver) when compared to the arrival time of a SPICE simulation.

It is desirable to provide an equivalent waveform model (EWM) that can generate an equivalent waveform from a noisy waveform so that that arrival time and/or delay time can be more accurately determined from the equivalent waveform.

The equivalent waveform model (EWM) may be used as a model in a gate delay calculator within a static timing analyzer, such as for example, the static timing analyzer and gate delay calculator described in U.S. patent application Ser. No. 12/269,037 entitled COMPACT MODELING OF CIRCUIT STAGES FOR STATIC TIMING ANALYSIS OF INTEGRATED CIRCUIT DESIGNS filed on Nov. 11, 2008 by Igor Keller et al, which is hereby incorporated by reference.

Equivalent Waveform Model

Figure 3A:
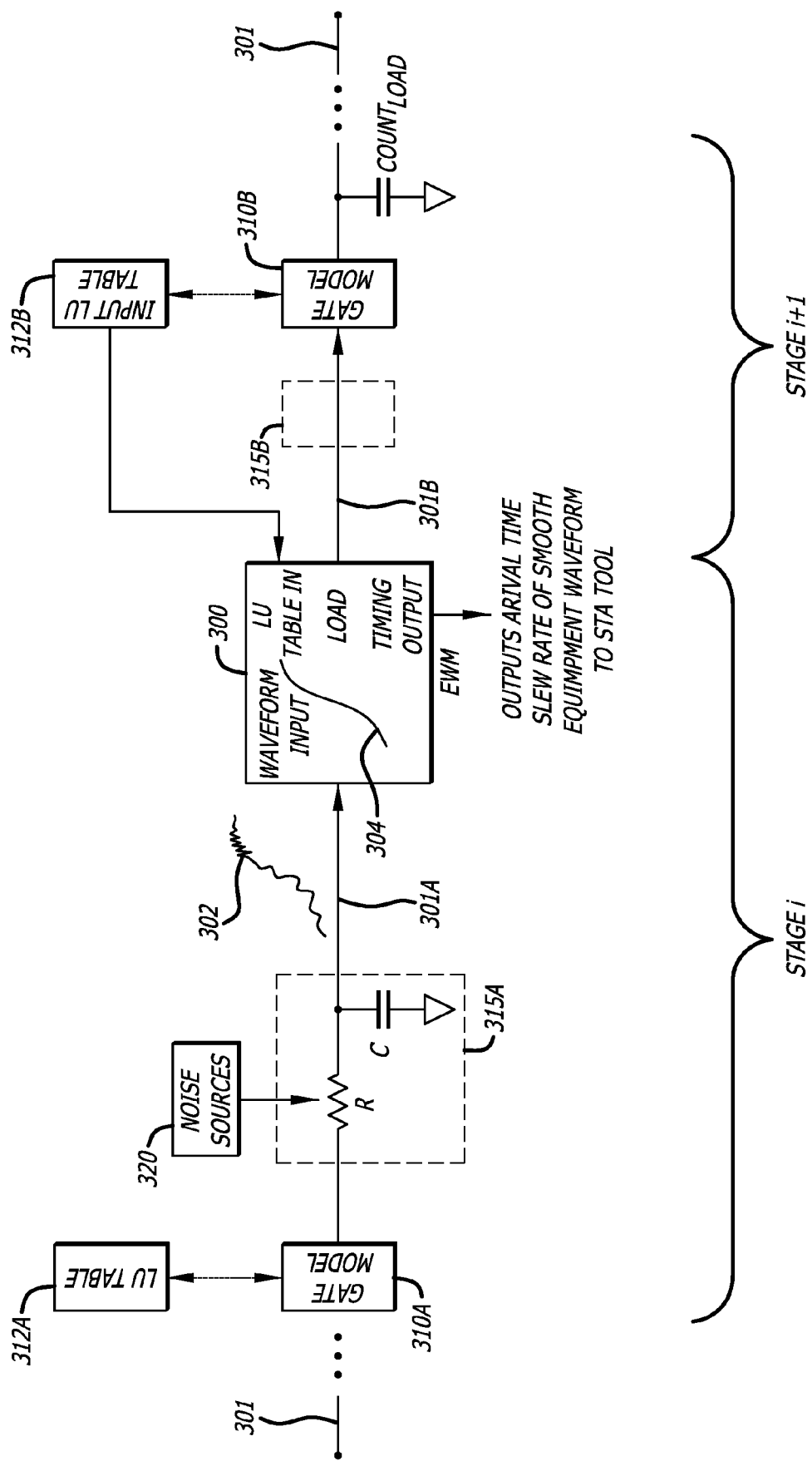
FIG. 3A is a block diagram illustrating the equivalent waveform model within a stage coupled between an output driver gate model in the given stage and the input receiver in the next stage.

Referring now to FIG. 3, an equivalent waveform model (EWM) 300 is presented to improve accuracy in delay calculations especially in presence of nonlinear or noisy input waveforms. The EWM 300 is generated stage by stage along a path with the output timing results of each being provided to a static timing analyzer.

The EWM 300 receives a noisy waveform 302 and mathematically generates a smooth equivalent waveform 304 within the model. The smooth equivalent waveform 304 is used to determine slew rate, delay time and/or arrival time which is output by the EWM 300 for use by the static timing analyzer. To determine what equivalent waveform to generate, the EWM 300 within a given stage i is trained partly in response to an input model of the gate model 310B in a next stage stage$_{i+1}$ and the values within its input look up table 312B.

The gate model 310A may generate a smooth waveform at its output that is corrupted with noise by various noise sources along the signal path i through the model of the interconnect 315A to form the noisy waveform 302. Exemplary instances of the noisy waveform 302 are shown in FIG. 2B. Exemplary instances of a smooth waveform 304 are shown in FIG. 2A.

Figure 3B:
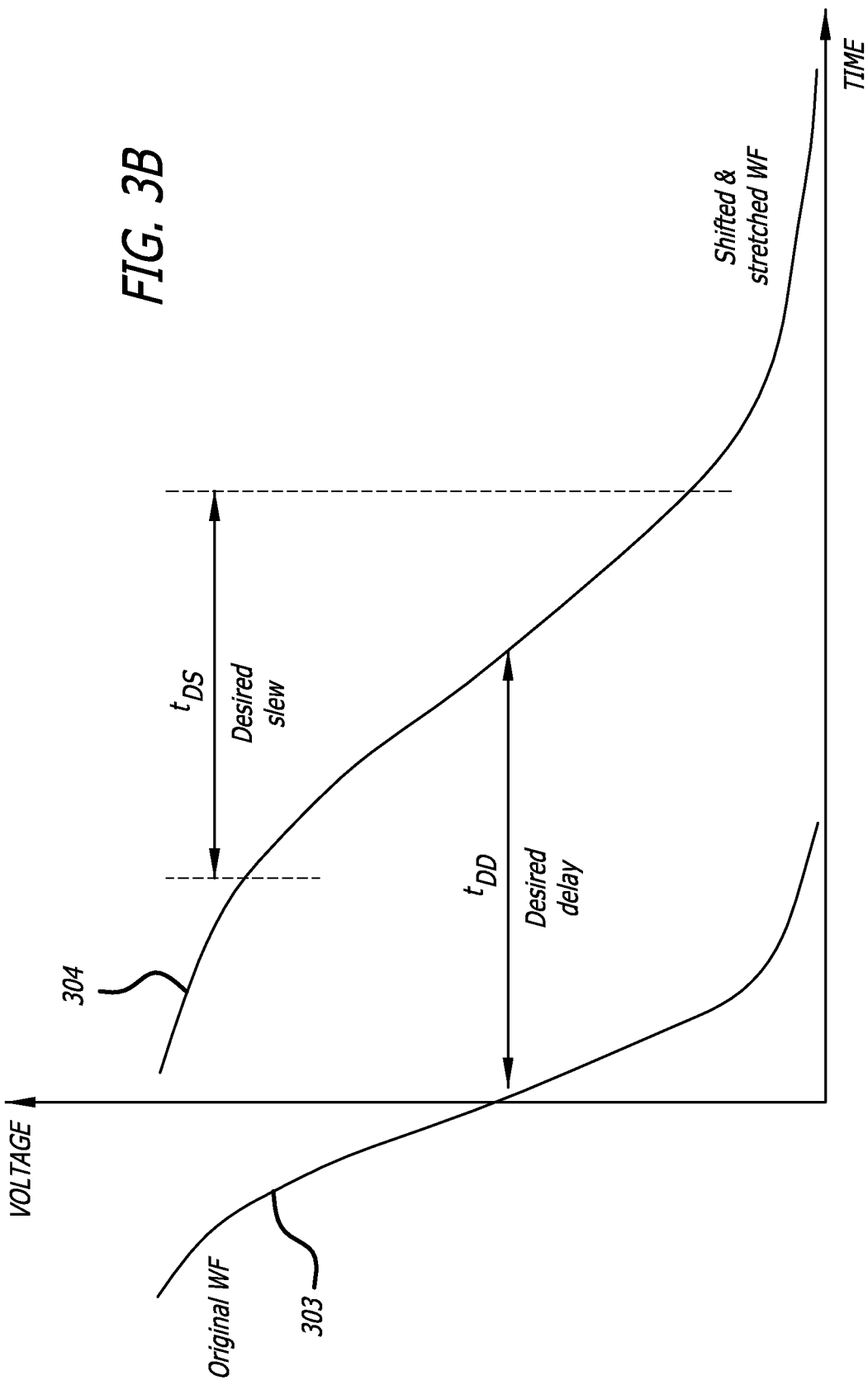
FIG. 3B is a waveform diagram illustrating shifting and stretching of an original waveform into an equivalent waveform.

The smooth waveform is formed by using a set of input waveforms from a timing library associated with a circuit cell library. A selected one of the input waveforms in the timing library can be stretched and shifted into the smooth waveform with a slew and timing delay similar to the computed timing delay and the computed slew generated from the noisy waveform. As shown in FIG. 3B, the smooth waveform 304 may be formed by shifting and stretching an input waveform 303. The original waveform 303 may be shifted in time by a desired time delay $t_{DD}$ and stretched out in time to achieve a desired slew rate $t_{is}$ to form the smooth waveform 304.

The equivalent waveform model 300 is based on the notion of a generalized delay metric which is built using properties of the receiving cell 310B and the load 315A of the correspondent instance. In one embodiment, a delay metric is constructed using a high-order integral function ($I_{kj}$) of the product of time points ($q_k$) from the input waveform 302 and a corresponding weighting function (W(v)) which is based on respective voltage points on the same input waveform 302. Effective current source model (ECSM) waveforms and their respective delays in a lookup-table 312B of a timing library or standard cell library can be used to train the delay metric so that parameters of the delay metric can be derived using a least-square fitting. The trained delay metric may then be used to predict or compute the cell delay for a distorted input waveform 302 within about five percent 5% of the cell delay determined from a SPICE circuit simulation.

The equivalent waveform model (EWM) allows one to build for each computed transition (waveform), an equivalent waveform for which the path delay computed in STA correlates better to that computed in using SPICE. The EWM is constructed using the delay and other characteristics of the receiving cell (cell type, delay and slew model), as well as the total output capacitive load of the receiving gate. One approach to building the EWM is to approximate the delay or arrival time of a transition by a nonlinear integral equation formed with parameters that can be fitted using a timing (delay and slew) model of the receiving gate.

A method for extracting two parameters to represent a transition is now described. The method is based on a generalization of the parameterized functional of Equation A. The goal or idea is to capture more detailed information of the waveform than just the three time values of slew rate, arrival time, and crossing time. Two forms of an equivalent waveform model (EWM) are considered. The equivalent waveform model may be used to determine delay and slew of a stage with a delay metric or alternatively an arrival time with an arrival time metric.

In one form, a generic delay metric is introduced that can be trained using existing pre-driver waveforms, and subsequently used to predict the delay for nonlinear and noisy waveforms accurately when compared to a SPICE simulation of same. The delay determined by the delay metric may be readily converted into an arrival time by noting that the value of arrival time output ATout is equal to the sum of arrival time input ATin and delay (ATout=ATin+delay). Alternatively, an arrival time may be directly computed with an EWM using an arrival time metric.

Delay Metric for Equivalent Waveform Model

The delay time $J_{DM}$ of the equivalent waveform model (EWM) can be defined by the following functional, a high-order integral function of the product of time points $Q_k$ from the received input voltage waveform v and a corresponding weight function W(v) that is based on respective voltage points on the input voltage waveform v:

$$J_{DM} = \int_{V_L}^{V_H} Q_k(t(v) - t_{ref})W(v)\,dv. \quad \text{(Eq. 1)}$$

A conventional reference time $t_{ref}$ is measured on the waveform defined by a voltage function v(t), or conversely a waveform defined by a time function t(v). Measuring reference time $t_{ref}$ on a waveform defined by a time function t(v) is more convenient since the function t(v) can be normalized over the power supply voltage (Vdd) with voltage defined on a finite set of zero and one [0, 1]. For example, the reference time $t_{ref}$ may be measured at the voltage 0.1 Vdd for each waveform.

The time point function $Q_k(.)$ and the weighting function W(v) are chosen in such a way that the delay metric d of equation one (Eq. 1) approximates the delay of the gate for a given lumped capacitive load $C_L$ over a wide family of input waveforms t(v). The upper voltage parameter $V_H$ and the lower voltage parameter $V_L$, setting the voltage range over which the integral is taken, are defined as $V_L$=0.2 Vdd (20% of the power supply) and $V_H$=Vdd (100% of the power supply) for a rising transition. For a falling transition, the upper and lower voltage parameters $V_H$ and $V_L$ are respectively defined as $V_L$=0.8 Vdd (80% of the power supply) and $V_H$=0 (zero volts or 0% of the power supply).

For the delay metric, the forms of the time point function $Q_k(.)$ and the weighting function W(v)) may be equations 2 and 3 as follows:

$$Q_k(x) = \sum_{k=0}^{K} q_k x^k \quad \text{(Eq. 2)}$$

$$W(v) = (v - V_L)^n (V_H - v)^m \quad \text{(Eq. 3)}$$

The coefficients in equations 2 and 3 may be selected to be K=2, m=1, and n=2 for minimum delay or alternatively n=3 for maximum delay, for example. If either of the upper and lower voltage parameters differ as a function of rising and falling transitions, such as suggested above, the weighting function W(v) and delay will differ as a function of whether or not a rising or falling transition is to occur.

The parameters of time points $q_k$ (time point coefficients) in the delay metric d of equation 1 may be found through a least-square fitting using the set of input voltage waveforms and the correspondent timing delays from a timing library for the receiving gate. For example, an input lookup table of timing delay values of a non-linear delay gate model (NLDM gate model) of the receiving gate may be used. In this manner, the EWM gains an understanding of what types of input waveforms the receiving gate can receive and how the gate behaves in response to various input waveforms so that it can generate an appropriate equivalent waveform.

Introducing equations 2 and 3 into equation 1, a timing equation for the j-th input waveform to determine correspondent timing values $d_j$ (timing delay values or slew rate timing values) (from the library for the receiving gate) is as follows:

$$d_j \approx \sum_k q_k I_{kj} \quad \text{(Eq. 4)}$$

where $I_{kj}$ is a waveform value or moment. The timing equation, Eq. 4, associates the timing values with the waveform values. The waveform values or waveform moments $I_{kj}$ for a given waveform j is determined from a waveform fitting equation, equation 5, as follows:

$$I_{kj} = \int_{V_L}^{V_H} (t_j(v) - t_{ref,j})^k W(v) dv \quad \text{(Eq. 5)}$$

The time point coefficients $q_k$ to minimize the error in equation 4 may be determined by minimizing a sum of squares equation, with the least squares equation 6, as follows:

$$\sum_j \left( d_j - \sum_k q_k I_{kj} \right)^2 \rightarrow \min \quad \text{(Eq. 6)}$$

One method of determining the time point coefficients $q_k$ is to use a linear matrix equation, equation 7, as follows:

$$Iq = d \quad \text{(Eq. 7)}$$

Figure 7A:
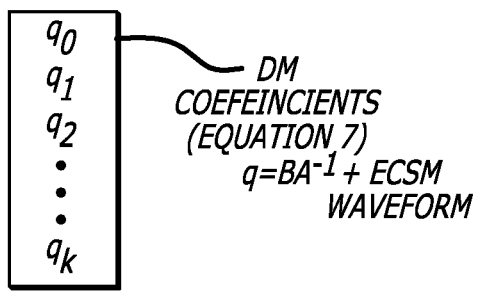
FIG. 7A illustrates a list of EWM delay metric coefficients that may be stored in memory that train the model for use in delay calculation of a given stage.

This equation is understood to be solved in the least-squares sense, as in Eq. 6 for example, using a standard linear algebra package such as LAPACK. In equation 7, the matrix q is the set defined by $q=\{q_k\}$. The matrix I is defined by the integrals of equation 5. The vector d is defined by the timing data. See FIG. 7A for example. In equation 7, the waveform fitting matrix I is the set defined by $I=\{I_{kj}\}$ and the vector d is the set of timing values defined by $d=\{d_j\}$. The time point coefficient vector or matrix q can be found be rearranging equation 7 as $q=dI^{-1}$. Finding the time point coefficients of the time point matrix q may be referred to as EWM model training, EWM model construction, or constructing an EWM model herein. As shown in FIG. 7A, the delay metric (DM) or time point coefficients q may be stored as a list, table, or matrix in a storage device (e.g., memory, hard drive, optical disk). With the waveform fitting matrix I and the time point coefficient matrix q known, a corresponding delay may be found by utilizing equation 4. The delay for a given waveform j is the sum of products of the time point coefficients $q_k$ and waveform fitting values $I_{kj}$.

While this form of EWM model, the delay metric EWM model, has been described as computed for time delay, it can be easily adapted to compute arrival times through an equation to determine the value of arrival time output ATout. The arrival time output ATout is equal to the sum of arrival time input ATin and the delay (ATout=ATin+delay). Alternatively, arrival time may be directly computed using the EWM model with an arrival time metric as explained further herein.

Arrival Time Metric for Equivalent Waveform Model

It may be preferred to determine arrival time at a gate instead of delay time through the gate. The equivalent waveform model may be used to determine arrival time at a final stage with an arrival time metric (ATM). The equivalent waveform model for arrival time is based on a simple fitting arrival time equation, equation 8, as follows:

$$AT = d_0 + \int_{t_0}^{\infty} P(v(t)) dt \quad \text{(Eq. 8)}$$

In the arrival time equation, the vector $P(v) = p_1 v + \ldots + n_n n$ is a polynomial of order n as a function of v with coefficients $p_1$ through $p_n$. The variable v(t) is a normalized (falling) transition defined by equation 9 as follows:

$$v = \begin{cases} 1, & \text{if } V > V_{dd} - V_{th} \\ V/(V_{dd} - V_{th}), & \text{otherwise} \end{cases} \quad \text{(Eq. 9)}$$

In equation 9, the variable V is the input variable voltage level on the falling transition, and the threshold voltage $V_{th}$ is a phenomenological constant.

In addition, the polynomial coefficients $p_1$ through $p_n$ (referred to by $p_i$) of the polynomial P(v) are subject to the following constraints:

$$\Sigma p_i = 1 \quad \text{(Eq. 10)}$$

$$\Sigma i p_i v^{i-1} > 0, v \in [0,1] \quad \text{(Eq. 11)}$$

The delay coefficient $d_0$ for delay or arrival time without noise and the polynomial coefficients $p_i$ are obtained from fitting the expressions of Eqs. 8-11 with data available from a standard cell library. It is assumed that the delay information in the standard cell library is based on a non-linear delay model (NLDM) and that the input waveforms used in the characterization to determine the delay or arrival time information are known. Normalized (using (Eq. 7)) noisy input waveforms (WFs) $u_k(t)$ correspond to a given (actual) output load i, and generate a corresponding gate delay matrix $D_k$ (a delay and slew model of the receiving gate) with arrival time moments $d_{kj}$ that may be determined with equation 12 as follows:

$$d_{k,i} = \int_{t_0}^{\infty} u_k^i(t) dt. \quad \text{(Eq. 12)}$$

The input waveform can be shifted so that its reference time (e.g., 0.5 Vdd cross-point) is at time zero (t=0). In which case, the arrival time of equation 8 can be expressed in an arrival time equation, equation 13 as follows:

$$d_0 + \Sigma p_i d_{k,i} \approx D_k \quad \text{(Eq. 13)}$$

With the constraints of equations 9-10, a least mean square (LMS) fitting may be used to compute the coefficients with equation 14 as follows:

$$\Sigma (d_0 + \Sigma p_i d_{k,i} - D_k)^2 \rightarrow \min \quad \text{(Eq. 14)}$$

Figure 7B:
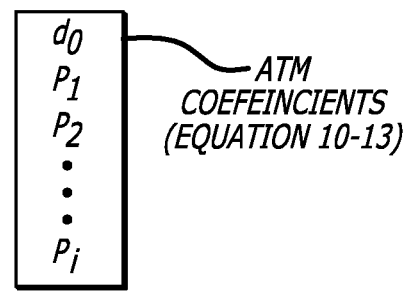
FIG. 7B illustrates a list of EWM arrival time metric coefficients that may be stored in memory that train the model for use in arrival time calculations for a given stage.

Mathematical methods of determining the coefficients from equations 9, 10, and 13 are known. Arrival time metric (ATM) coefficients (noiseless delay coefficient $d_0$ and the polynomial coefficients $p_i$) for the arrival time metric EWM may be tabulated into a table or matrix such as shown in FIG. 7B. With the arrival time coefficients being known, equation 13 can be used to compute arrival time.

Methods of Delay/Arrival Time Calculations with EWM

Figure 6:
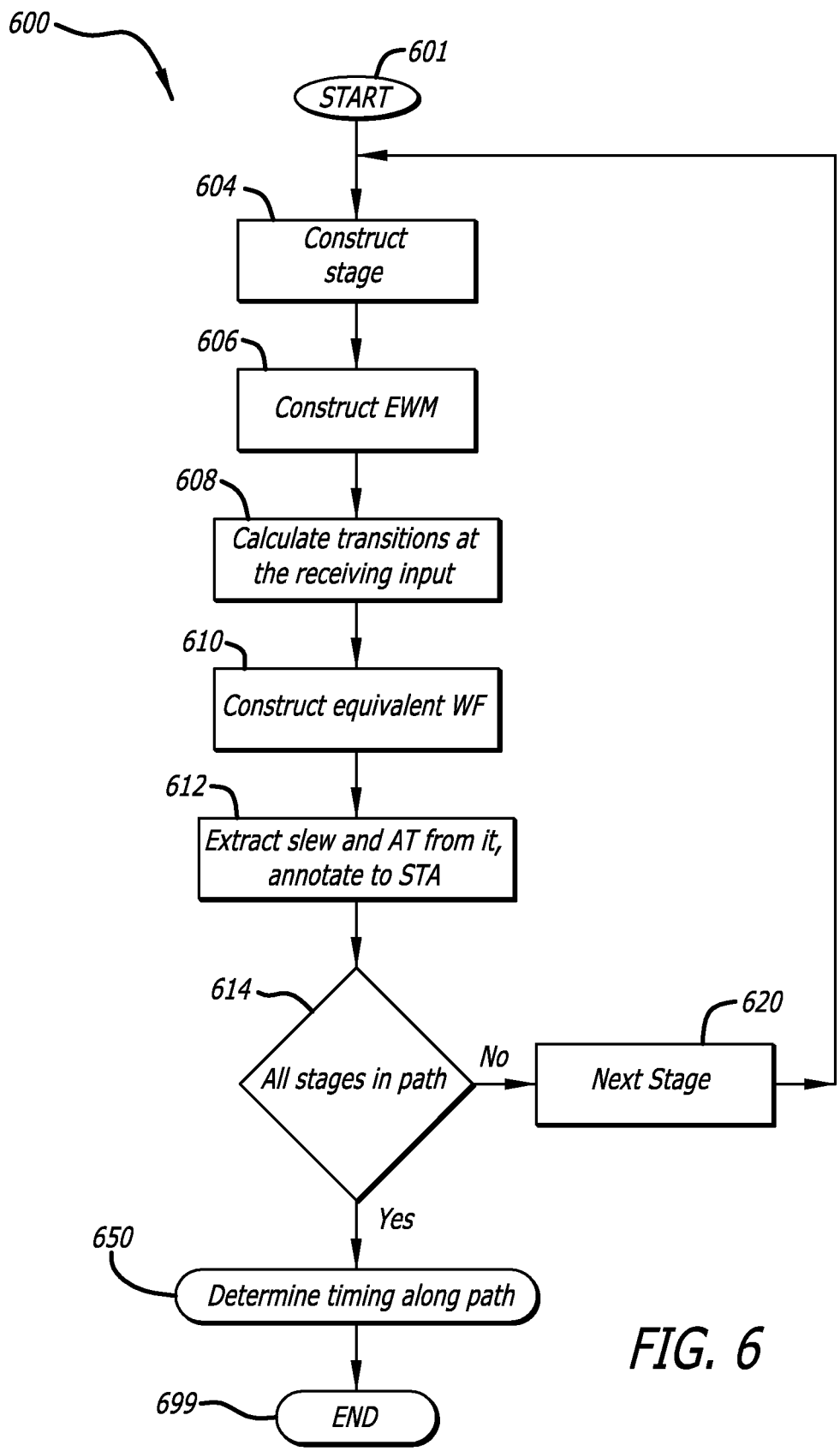
FIG. 6 is a flow chart illustrating a method of using the EWM for delay calculation stage by stage to perform static timing analysis of a circuit in accordance with one or more embodiments of the invention.

Referring now to FIG. 6, a flow chart 600 is illustrated to describe a method of delay and/or arrival time calculation with an equivalent waveform model (EWM). The method starts at process block 601 and then goes to process block 602.

At process block 602, a netlist of an integrated circuit design upon which to perform static timing analysis is read. A signal path from input to output terminal is selected to be statically analyzed for timing. The selected signal path may be one of one or more expected worst case delay paths in the integrated circuit. The method then goes to process block 604.

At process block 604, a given stage, stage i, of the selected path is constructed. An input portion of the next stage, stage i+1, along the selected patch such as shown in FIG. 3 may also be constructed. Information about the receiving gate 310B is gathered including its total output capacitive load Coutload, cell type (e.g., AND, NAND, NOR, OR, INVERT, XOR, XNOR), and its delay/slew tables 312B. This information about the receiving gate 310B may be available from the netlist of the circuit stored in the design data base (e.g., total output capacitive load and cell type) and a standard cell library (e.g., delay/slew tables 312B). The process then goes to block 606.

At process block 606, the equivalent waveform model (EWM) is formed or constructed. Delay and slew models of the equivalent waveform model (EWM) may be constructed by fitting time point coefficients $q_k$ of a predefined expression (Eq. 4) containing a fitting equation $I_{kj}$ that is a time domain integral of a function of voltage transition. The slew model is constructed in precisely the same way as the delay model but using slew data as the timing data instead of delay data. The delay and slew models of the equivalent waveform model (EWM) approximate the delay and slew respectively over the receiving gate 310B for a given transition in the input waveform 302. For the selected delay metric or arrival time metric, the EWM is trained with the coefficients for the model (e.g., FIG. 7A or 7B) being temporarily stored in memory or other storage device. With the model trained, the received input waveform may be analyzed to generate an equivalent waveform. The process then goes to block 608.

At process block 608, the received input waveform is analyzed to calculate transitions, such as from noise or other glitch sources. The process then goes to block 610.

At process block 610, an equivalent waveform 304 may be constructed in response to the trained equivalent waveform model (EWM) and the calculated transitions. The equivalent waveform model (EWM) uses the constructed slew and delay models, such that for any given transition in the input waveform 302, the EWM generates another (equivalent) transition in the equivalent waveform 304. The (equivalent) transition in the equivalent waveform 304 is generated so that delay/slew over the receiving gate 310B can be found from the look-up tables 312B of the respective timing model 310B. Furthermore, the (equivalent) transition in the equivalent waveform 304 is generated so that it is close to the waveform generated from a device-level (e.g., SPICE) simulation of the receiving gate 310B and its output load Coutload when the actual transition in the waveform 302 is applied directly to its input.

For a sensitivity analysis of a circuit, an equivalent sensitivity waveform may be computed from the actual sensitivity response input. With an equivalent waveform 304 or an equivalent sensitivity waveform generated, the process may go to block 612.

At block 612, slew, delay time and/or arrival time are extracted or determined from the equivalent waveform 304. Alternatively for a sensitivity analysis, the sensitivity of delay and slew may computed from the equivalent sensitivity waveform.

The equivalent waveform model (EWM) may be used in the context of delay calculation in the presence of crosstalk and process variations. For each (possibly noisy) transition at a receiving term an equivalent transition is computed using EWM. The delay/arrival time and slew of the equivalent transition is extracted. The extracted slew, delay time and/or arrival time are communicated to a timer in the static timing analyzer to for annotation to the static timing analysis for further analysis of the path. Similarly, the sensitivity of delay and slew computed from the equivalent sensitivity waveform are reported to timer of the static timing analyzer. With the timing or sensitivity information of the stage i reported to the static timing analyzer, the process may then go to block 614.

At block 614, a determination is made if all the stages in the path under analysis have been analyzed. If so, the process goes to block 650. If not all stages have been considered, the process goes to block 620.

At process block 620, assuming not all stages have been considered, the next stage for analysis is selected and the process returns to block 604 to repeat steps 604 through 614.

At process block 650, assuming all stages have been considered, the desired timing characteristic along the path is determined. If timing delay along the path from input pin to output pin due to the stage delays is the desired timing characteristic, the timing delays for each stage may be summed together. If the arrival time at an output pin is the desired timing characteristic, the arrival times for the output node of each stage may be summed together and attributed to the output pin. After the desired timing characteristic is determined along the selected path, it may be reported out through the user interface (e.g., printed on monitor at a terminal, or paper by a printer) and the process may go to block 699 and end.

Example Training and Experimental Results

Figure 4A:
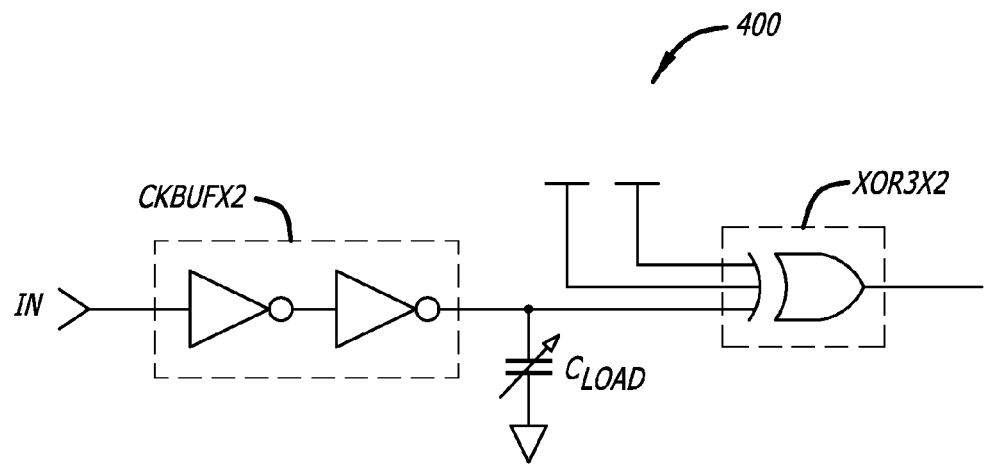
FIG. 4A is a schematic diagram of an exemplary circuit that is used to train and test the equivalent waveform model against an NLDM lookup table gate model and a SPICE circuit simulator.

Referring now to FIG. 4A an exemplary circuit 400 is illustrated including an exclusive or gate XOR3X2 and a clock buffer CKBUFX2 coupled together in series as shown. The circuit 400 was used to characterize the delay metric form of the equivalent waveform model (EWM) and test it against a nonlinear delay model (NLDM). The exclusive or gate XOR3X2 was driven by the clock buffer CKBUFX2 during characterization.

Referring to FIG. 2C, seven different waveforms and the correspondent delays from the lookup table for the XOR3X2 were used to train the delay metric (Eq. 1) of the EWM for the XOR3X2 cell. The coefficients for the delay metric found from the training may be stored as a list in memory such as shown in FIG. 7A. If an arrival time metric, the coefficients found from training may be stored as a list in memory such as shown in FIG. 7B.

Figure 4B:
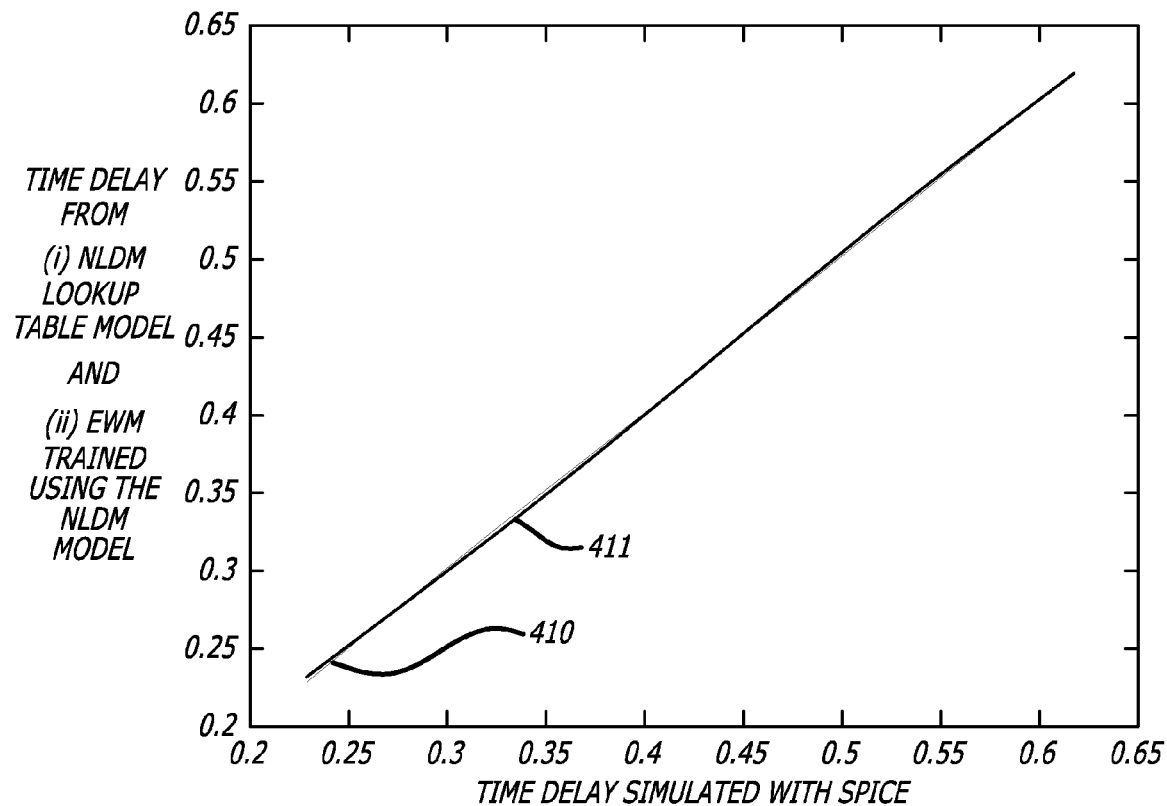
FIG. 4B is a chart illustrating correlation of the time delays determined by calculation with the EWM and through lookup with the NLDM lookup table model versus SPICE simulation for the seven ECSM waveforms of FIG. 2C used for training.

Referring now to FIG. 4B, a chart illustrates the correlation of the time delays determined by calculation with the EWM and through lookup with the NLDM lookup table model versus spice for the seven ECSM waveforms of FIG. 2C used for training. The chart of two plotted lines indicates how closely correlated the computed time delay of the trained delay metric of the EWM is to the time delay read out from the input look up tables of the NLDM gate model. The percentage different between the two plotted lines is miniscule.

The equivalent waveform model (EWM) was further tested (noisy waveform test) with distorted waveforms such as those due to a signal integrity (SI) analysis. For example, FIG. 2B illustrates waveforms 202 and 203 that are noisy in comparison to waveform 201.

Figure 5:
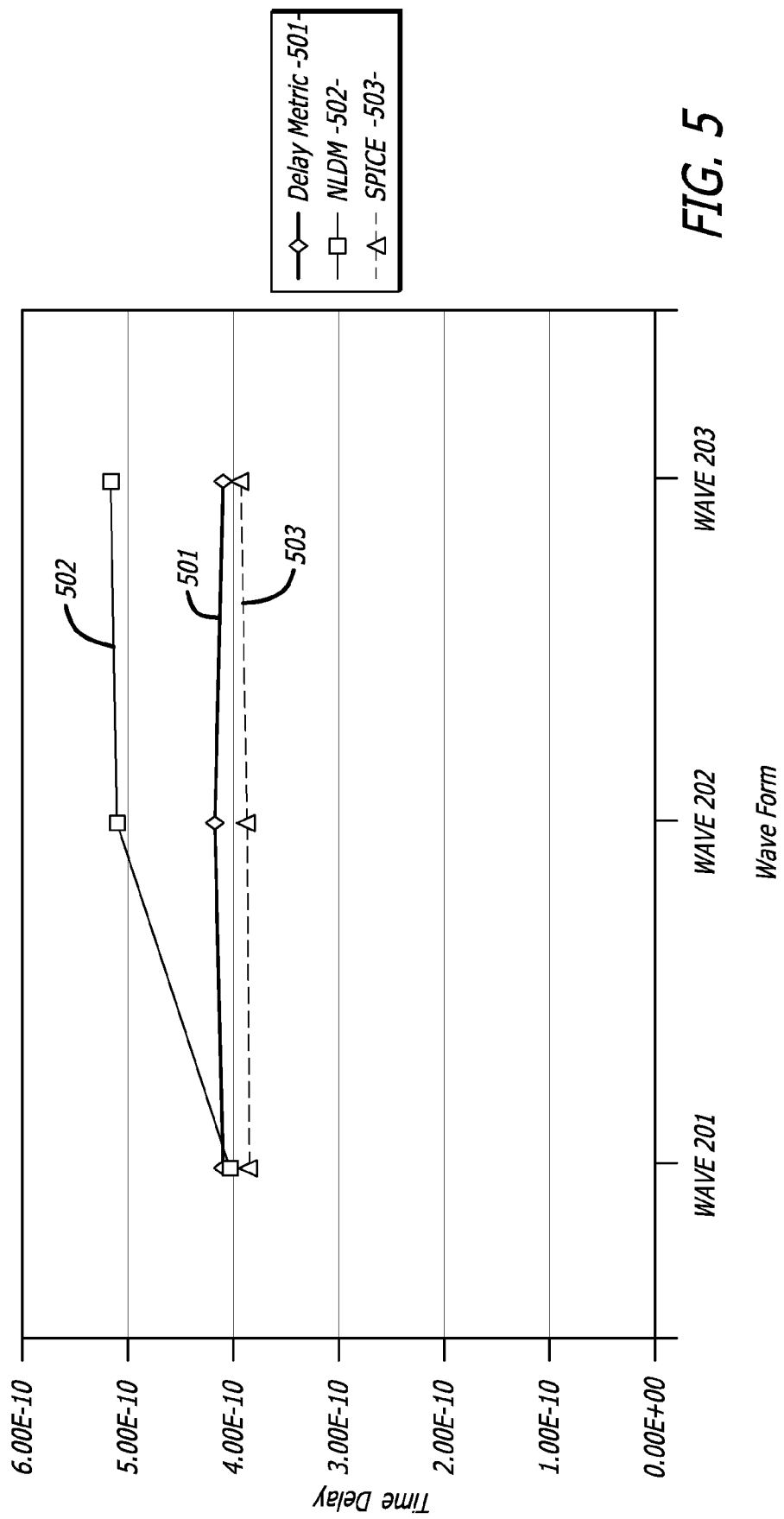
FIG. 5 is a chart illustrating correlation of time delays determined by calculation with EWM, lookup with NLDM lookup table model, and SPICE simulation for different waveforms (e.g., smooth, noisy1, noisy2).

Referring now to FIG. 5, a chart of waveforms illustrates the time delay measured in the circuit 400 for three different waveforms, waveforms 201-203, versus the different measurement methods, EWM delay metric 501, NLDM gate model 502, and SPICE transistor level circuit simulator 503. As shown in FIG. 5 of the plots for the smooth waveform 201, each of the measurement methods 501-503 are reasonably correlated together. For the first noisy waveform 202, the EWM delay metric 501 and the SPICE transistor level circuit simulator 503 are reasonably correlated together but the NLDM gate model 502 is not. For the third noisy waveform 202, the EWM delay metric 501 and the SPICE transistor level circuit simulator 503 remain reasonably correlated together but the NLDM gate model 502 is still not. This chart indicates that the time delay calculated from the EWM delay metric 501 and simulated by the SPICE transistor level circuit simulator 503 can remain reasonably correlated together over various types of noisy waveforms.

This noisy waveform test of the EWM delay metric against the NLDM gate model and a SPICE transistor level circuit simulator suggests that the EWM delay metric is capable of accurately predicting the time delay of distorted waveforms within about five percent (5%) of a SPICE circuit simulation. As shown in FIG. 5, the use of the EWM delay metric in a noise-on-delay analysis provides results that correlate well with a SPICE circuit simulation.

Exemplary Applications

The embodiments of the invention may be applied in the design of an integrated circuit whenever a static timing analysis is performed. The embodiments of the invention may be applied to a delay calculation step in the static timing analysis that may be called for either in the sign-off phase of the chip or other implementation design flows of electronic design integration (EDI) systems. For example, embodiments of the invention may be used in performing static timing analysis whenever a strong crosstalk noise causes transitions in the input waveform to cross 0.5 Vdd level three or more times. Standard measurement techniques of delay and slew on such a waveform is an ill-defined problem, possibly leading to high inaccuracy and non-robust (i.e. non-continuous w.r.t. design parameters) results. By using an equivalent waveform model (EWM) to generate an equivalent waveform in response to such an input waveform, accuracy and robustness of the timing results can be improved.

Electronic Design Automation System

Figure 8A:
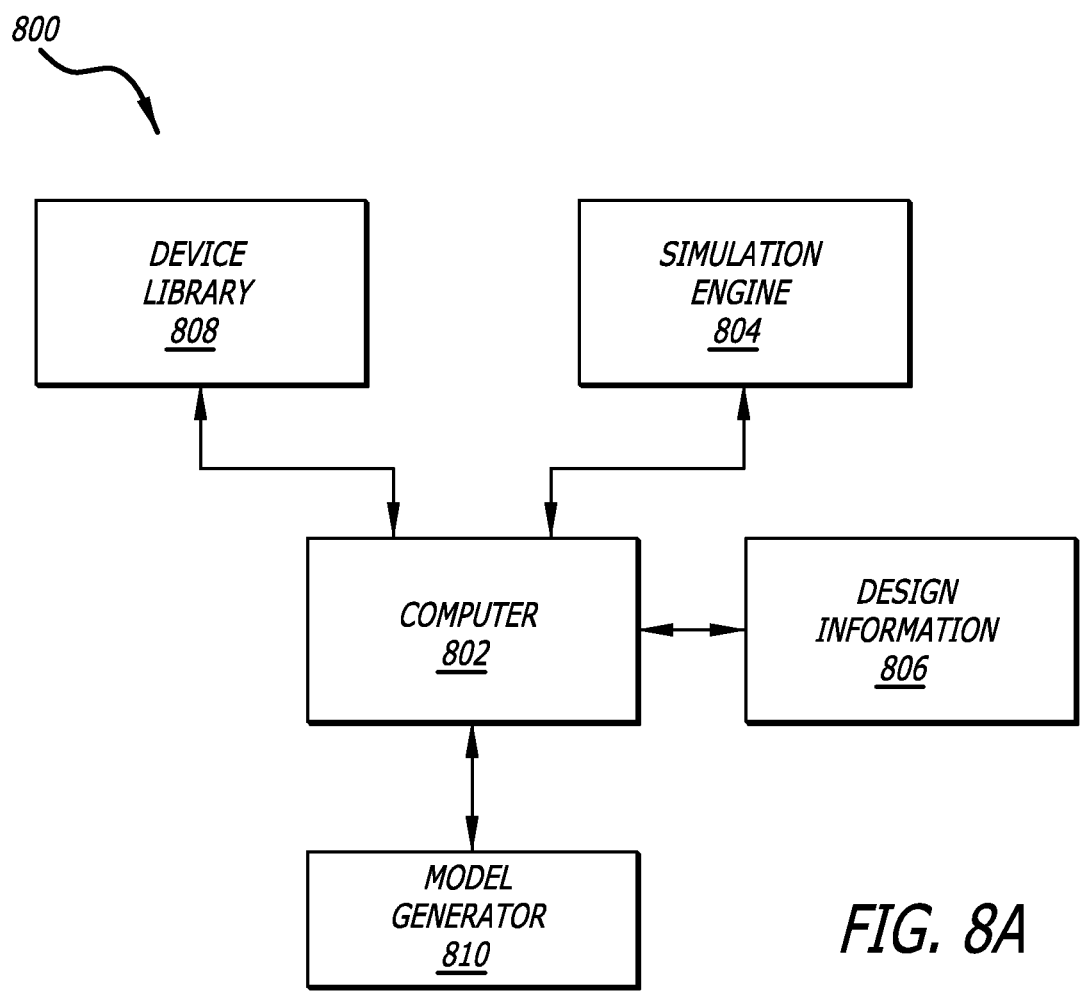
FIG. 8A illustrates a block diagram of an electronic computer aided design (ECAD) automation system.

Referring now to FIG. 8A, a block diagram of an electronic design automation system 800 is illustrated for performing the static timing analysis of the algorithmic methods described herein. The electronic design automation system 800 includes a computing system or computer 802, a simulation engine 804, a design information database 806 stored in a storage device, a device library stored in a storage device, and a model generator 810.

The computer 802 executes the simulation engine 804 for simulating the operation and performance of an electrical circuit under design. The simulation engine 804 may be a static timing analyzer or a statistic static timing analyzer. The computer 802 receives design information 806, such as a net list of a circuit design, corresponding to the electrical circuit under design. The computer 802 retrieves corresponding models from a device library 808, and executes a design simulation (e.g., a static timing analysis or a statistical static timing analysis) using the simulation engine 804. The simulation engine 804 executed by the computer 802 solves vector equations and performs matrix operations to represent the output waveforms and push waveforms through the circuit design in order to perform the algorithmic methods described herein.

The electronic design automation system 800 may further comprise a model generator 810 for generating device models for standard cell circuits (logic cells) that are stored in the device library 808. The model generator 810 may be used to characterize or pre-characterize each logic cell or standard cell circuit for output waveforms, parameter variations, and basis vectors which may be stored with the device library to perform the algorithmic methods described herein.

For simulation, the model generator 810 may be used to generate a linear time varying input and output equivalent models for each non-linear standard circuit cell or logic cell instantiated in the netlist. The model generator 810 may be used to generate a linear reduced order model of the RC interconnect between each instantiation of a standard circuit cell or logic cell. The model generator 810 may be used to combine the models together and form vector equation solutions to form output waveforms of a circuit stage in response to different circuit parameters.

While the models that are generated may be linear for ease of computations, the output waveforms are not limited to linear waveform expressions. The resulting output waveform expressions may include non-linear waveform expressed portions, such as an exponential waveform expressed portion.

The simulation engine 804, the design information 806, the device library 808, and the model generator 810 may reside in an internal storage device (e.g., memory or hard drive) or external storage device (e.g., hard drive, storage media) that may be respectively internal or external to the computer 802.

Figure 8B:
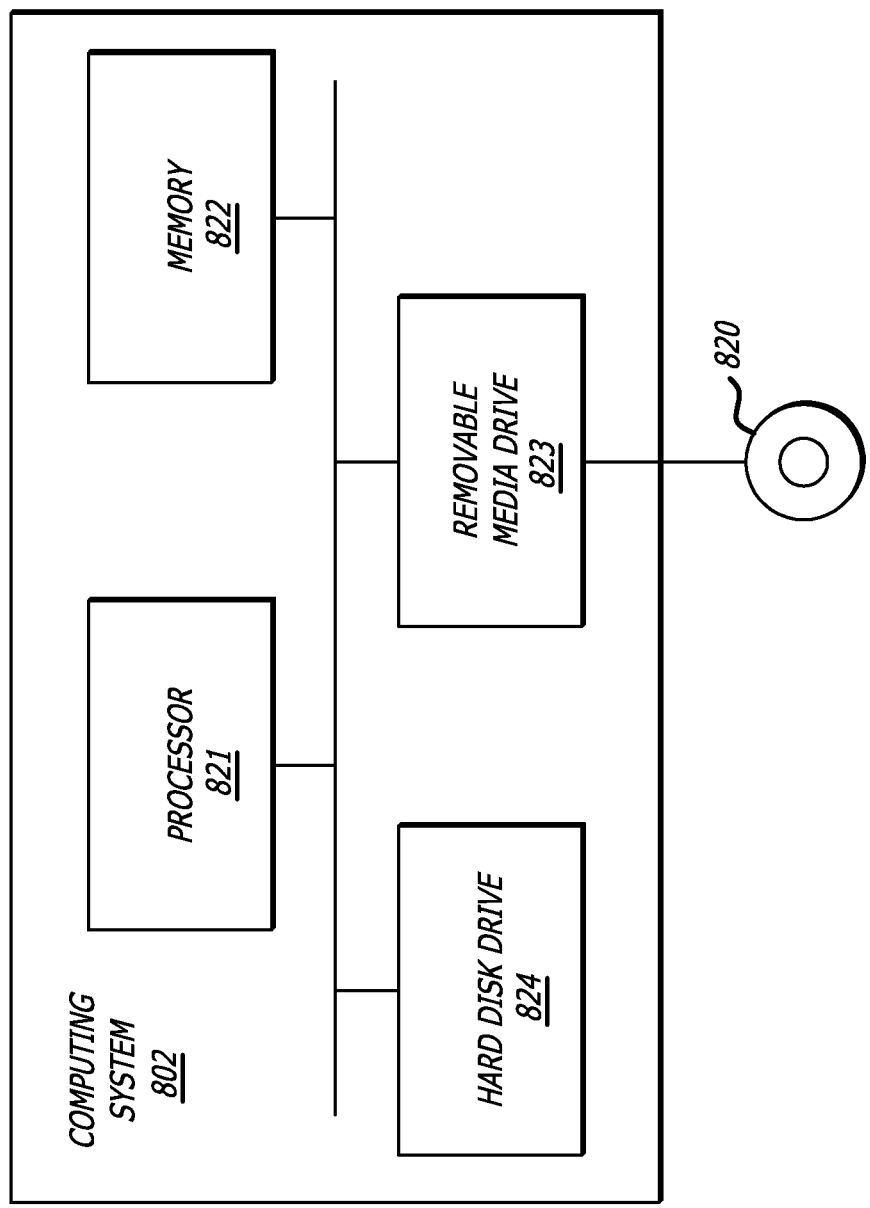
FIG. 8B illustrates an exemplary embodiment of a computing system for use in the ECAD automation system.

Referring now to FIG. 8B, a computing system 802 is illustrated that may be used to perform some or all of the processes in accordance with a number of embodiments of the invention. The computing system 802 may include a processor 821, a memory 822, a removable media drive 823, and a hard disk drive 824. In one embodiment, the processor 821 executes instructions residing on a machine-readable medium, such as the hard disk drive 824, a removable medium 820 (e.g., an optical medium (compact disk (CD), digital video disk (DVD), etc.), a magnetic medium (magnetic disk, a magnetic tape, etc.), or a combination of both. The instructions may be loaded from the machine-readable medium into the memory 822, which may include Random Access Memory (RAM), dynamic RAM (DRAM), etc. The processor 821 may retrieve the instructions from the memory 822 and execute the instructions to perform the operations described above.

Note that any or all of the components and the associated hardware illustrated in FIG. 8B may be used in various embodiments of the system 800. However, it should be appreciated that other configurations of the system 800 may include more or less devices than those shown in FIG. 8B.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the non-manual, automatic, or automated action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relate to an apparatus or system for performing the operations described herein. This apparatus may be specially constructed for the required purposes, or it may comprise a general-purpose computer selectively activated or reconfigured by a computer program stored in the computer.

When implemented in a computer program or software, the elements of the embodiments of the invention are essentially the code segments to perform the necessary tasks. The program or code segments can be stored in a computer or processor readable storage medium or transmitted by a computer data signal embodied in a carrier wave over a transmission medium or communication link. The "processor readable storage medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The code segments may be downloaded via computer networks such as the Internet, Intranet, etc over various transmission medium and then stored in a processor readable medium.

Note that the processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the embodiments of the invention are not described with reference to any particular programming language. It will be appreciated that a variety of programming languages may be used to implement the teachings of the invention as described herein.

CONCLUSION

The embodiments of the invention have various advantages. For example, one advantage is that the embodiments of the invention improve the accuracy of calculating timing delay and slew rate of a waveform in a path/stage. Another advantage is that the embodiments of the invention can calculate timing delay and slew rate of a waveform in the presence of crosstalk, process variations, and other noise sources.

The embodiments of the invention are thus described. While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. Instead, the embodiments of the invention should be construed according to the claims that follow below.

What is claimed is:

1. A method for static timing analysis of integrated circuit designs, the method comprising:
reading a netlist of an integrated circuit design including a signal path from an input terminal to an output terminal;
constructing a first stage of the signal path between the input and output terminals, the first stage including a first gate model to model one or more logic gates of a first cell and a first interconnect model to model interconnect and noise sources in the first stage;
forming a first equivalent waveform model in the first stage of the signal path in response to a receiving gate in the first stage, the first equivalent waveform model adapted to receive a noisy input waveform and generate a smooth equivalent waveform in response to the noisy input waveform;
calculating first noisy waveforms in a first input signal coupled into the first equivalent waveform model;
generating a first smooth equivalent waveform in response to the first calculated noisy waveforms and the first equivalent waveform model; and
calculating first timing information from the first smooth equivalent waveform for the first stage of the signal path;
wherein one or more of the reading, constructing, forming, calculating, and generating are performed with a processor.

2. The method of claim 1, wherein the forming of the first equivalent waveform model includes
gathering information of a next stage along the signal path coupled to the first equivalent waveform model including information of a receiving gate to apply a load thereto, wherein the information gathered regarding the receiving gate includes one or more of a total output capacitive load, a cell type, and a delay and slew model.

3. The method of claim 1, wherein
the first timing information is a timing delay at the output computed from a delay and slew model of the receiving gate found in a timing library; and
the first equivalent waveform model is formed by fitting time point coefficients and known time delay values from the delay and slew model of the receiving gate to waveform values of input waveforms from the timing library.

4. The method of claim 3, wherein
the timing delay is determined by computing a sum of products of waveform model coefficients and waveform moments, and
the slew is determined from the noisy waveform by computing a difference between a low time point and a high time point.

5. The method of claim 4, wherein
the smooth waveform is formed by selecting one input waveform from a set of input waveforms in the timing library and appropriately stretching and shifting the selected one of the input waveforms such that the slew and timing delay of the smooth waveform is similar to the computed timing delay and the computed slew.

6. The method of claim 1, wherein
the timing information is an arrival time at the cell output computed from a delay and slew model of the receiving gate found in a timing library; and
the first equivalent waveform model is formed by fitting polynomial coefficients of a polynomial gate delay equation to known arrival values from the delay and slew model of the receiving gate and waveform values of input waveforms from the timing library.

7. The method of claim 1, further comprising:
constructing a second stage of the signal path coupled to the first stage, the second stage including a second gate model to model one or more logic gates of a second cell and a second interconnect model to model interconnect and noise sources in the second stage;

forming a second equivalent waveform model in the second stage of the signal path, the second equivalent waveform model adapted to receive a noisy input waveform and generate a second smooth equivalent waveform in response to the noisy input waveform;

calculating second noisy waveforms in a second input signal coupled into the second equivalent waveform model;

generating a second smooth equivalent waveform in response to the second calculated noisy waveforms and the second equivalent waveform model; and calculating second timing information from the second smooth equivalent waveform for the second stage of the signal path.

8. The method of claim 7, further comprising:
combining the first timing information and the second timing information together to determine timing information for the signal path.

9. The method of claim 8, wherein
the first and second timing information are respectively first and second time delays, and
the combining includes summing the first time delay and the second time delay together to determine an overall time delay for the signal path in the integrated circuit.

10. The method of claim 8, wherein
the first and second timing information are respectively first and second arrival times, and
the combining includes summing the first arrival time and the second arrival time together to determine an overall arrival time for the signal path in the integrated circuit.

11. The method of claim 1, wherein
the calculating of the first noisy waveforms in the first input signal includes:
determining timing and voltage values of the first noisy waveforms.

12. The method of claim 1, wherein
the generating of the first smooth equivalent waveform includes
using the timing and voltage values of the waveform and the first equivalent waveform model to compute waveform moments from a waveform fitting equation.

13. The method of claim 12, wherein
the calculating of the first timing information from the first smooth equivalent waveform includes
introducing the computed waveform moments into a delay equation to obtain the delay of the equivalent waveform.

14. The method of claim 1, further comprising:
fitting polynomial coefficients of an arrival time equation to known arrival time values from the delay and slew model of the receiving gate using arrival time moments computed from the input waveforms stored in the timing library, and
forming the arrival time of the smooth waveform using the polynomial coefficients and arrival time moments computed from the noisy waveform.

15. A system for analysis of integrated circuit designs, the system comprising:
a processor to execute instructions;
a storage device coupled to the processor, the storage device to store instructions that when executed by the processor cause the system to perform operations including
reading a netlist of an integrated circuit design including a signal path from an input terminal to an output terminal;
constructing a first stage of the signal path between the input and output terminals, the first stage including a first gate model to model one or more logic gates of a first cell and a first interconnect model to model interconnect and noise sources in the first stage;
forming a first equivalent waveform model in the first stage of the signal path in response to a receiving gate in the first stage, the first equivalent waveform model adapted to receive a noisy input waveform and generate a smooth equivalent waveform in response to the noisy input waveform;
calculating first noisy waveforms in a first input signal coupled into the first equivalent waveform model;
generating a first smooth equivalent waveform in response to the first calculated noisy waveforms and the first equivalent waveform model; and
calculating first timing information from the first smooth equivalent waveform for the first stage of the signal path.

16. The system of claim 15, wherein
the forming of the first equivalent waveform model includes
gathering information of a next stage along the signal path coupled to the first equivalent waveform model including information of a receiving gate to apply a load thereto, wherein the information gathered regarding the receiving gate includes one or more of a total output capacitive load, a cell type, and a delay and slew model.

17. The system of claim 15, wherein
the first timing information is a timing delay at the output computed from a delay and slew model of the receiving gate found in a timing library; and
the first equivalent waveform model is formed by fitting time point coefficients and known time delay values from the delay and slew model of the receiving gate to waveform values of input waveforms from the timing library.

18. The system of claim 17, wherein
the timing delay is determined by computing a sum of products of waveform model coefficients and waveform moments, and
the slew is determined from the noisy waveform by computing a difference between a low time point and a high time point.

19. The system of claim 18, wherein
the smooth waveform is formed by selecting one input waveform from a set of input waveforms in the timing library and appropriately stretching and shifting the selected one of the input waveforms such that the slew and timing delay of the smooth waveform is similar to the computed timing delay and the computed slew.

20. The system of claim 15, wherein
the calculating of the first noisy waveforms in the first input signal includes:
determining timing and voltage values of the first noisy waveforms;
and
the generating of the first smooth equivalent waveform includes
using the timing and voltage values of the waveform and the first equivalent waveform model to compute waveform moments from a waveform fitting equation.

21. The system of claim 20, wherein
the calculating of the first timing information from the first smooth equivalent waveform includes:

introducing the computed waveform moments into a delay equation to obtain the delay of the equivalent waveform.

22. The system of claim 15, further comprising:
fitting polynomial coefficients of an arrival time equation to known arrival time values from the delay and slew model of the receiving gate using arrival time moments computed from the input waveforms stored in the timing library, and
forming the arrival time of the smooth waveform using the polynomial coefficients and arrival time moments computed from the noisy waveform.

23. A non-transitory machine readable media having instructions stored thereon for static timing analysis of integrated circuit designs, the instructions when executed by a machine cause the machine to perform operations comprising:
reading a netlist of an integrated circuit design including a signal path from an input terminal to an output terminal;
constructing a first stage of the signal path between the input and output terminals, the first stage including a first gate model to model one or more logic gates of a first cell and a first interconnect model to model interconnect and noise sources in the first stage;
forming a first equivalent waveform model in the first stage of the signal path in response to a receiving gate in the first stage, the first equivalent waveform model adapted to receive a noisy input waveform and generate a smooth equivalent waveform in response to the noisy input waveform;
calculating first noisy waveforms in a first input signal coupled into the first equivalent waveform model;
generating a first smooth equivalent waveform in response to the first calculated noisy waveforms and the first equivalent waveform model; and
calculating first timing information from the first smooth equivalent waveform for the first stage of the signal path.

24. The non-transitory machine readable media of claim 23, wherein the forming of the first equivalent waveform model includes
gathering information of a next stage along the signal path coupled to the first equivalent waveform model including information of a receiving gate to apply a load thereto, wherein the information gathered regarding the receiving gate includes one or more of a total output capacitive load, a cell type, and a delay and slew model.

25. The non-transitory machine readable media of claim 23, wherein
the first timing information is a timing delay at the output computed from a delay and slew model of the receiving gate found in a timing library; and
the first equivalent waveform model is formed by fitting time point coefficients and known time delay values from the delay and slew model of the receiving gate to waveform values of input waveforms from the timing library.

26. The non-transitory machine readable media of claim 23, wherein
the timing information is an arrival time at the cell output computed from a delay and slew model of the receiving gate found in a timing library; and
the first equivalent waveform model is formed by fitting polynomial coefficients of a polynomial gate delay equation to known arrival values from the delay and slew model of the receiving gate and waveform values of input waveforms from the timing library.

27. The non-transitory machine readable media of claim 25, wherein
the timing delay is determined by computing a sum of products of waveform model coefficients and waveform moments, and
the slew is determined from the noisy waveform by computing a difference between a low time point and a high time point.

28. The non-transitory machine readable media of claim 27, wherein
the smooth waveform is formed by selecting one input waveform from a set of input waveforms in the timing library and appropriately stretching and shifting the selected one of the input waveforms such that the slew and timing delay of the smooth waveform is similar to the computed timing delay and the computed slew.

29. The non-transitory machine readable media of claim 23, wherein further instructions are stored on the non-transitory machine readable media such that when executed by the machine cause the machine to perform further operations comprising:
constructing a second stage of the signal path coupled to the first stage, the second stage including a second gate model to model one or more logic gates of a second cell and a second interconnect model to model interconnect and noise sources in the second stage;
forming a second equivalent waveform model in the second stage of the signal path, the second equivalent waveform model adapted to receive a noisy input waveform and generate a second smooth equivalent waveform in response to the noisy input waveform;
calculating second noisy waveforms in a second input signal coupled into the second equivalent waveform model;
generating a second smooth equivalent waveform in response to the second calculated noisy waveforms and the second equivalent waveform model; and
calculating second timing information from the second smooth equivalent waveform for the second stage of the signal path.

30. The non-transitory machine readable media of claim 29, wherein further instructions are stored on the non-transitory machine readable media such that when executed by the machine cause the machine to perform further operations comprising:
combining the first timing information and the second timing information together to determine timing information for the signal path.

* * * * *